United States Patent
Wolf et al.

(10) Patent No.: US 12,129,928 B2
(45) Date of Patent: Oct. 29, 2024

(54) PNEUMATIC STANDSTILL SHAFT SEAL

(71) Applicant: Flowserve Pte. Ltd., Singapore (SG)

(72) Inventors: Johannes Wolf, Gelsenkirchen (DE); Guenter Nadolski, Dortmund (DE); Detlev Ulrich Steinmann, Waltrop (DE); Michael Schiller, Bad Krozingen (DE); Oliver Goetz, Castrop-Rauxel (DE); Jonathan Kleiner, Dortmund (DE); Berthold Vogel, Schwieberdingen (DE)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 17/742,851

(22) Filed: May 12, 2022

(65) Prior Publication Data
US 2023/0366469 A1    Nov. 16, 2023

(51) Int. Cl.
*F16J 15/38* (2006.01)
*F16J 15/00* (2006.01)

(52) U.S. Cl.
CPC ............. *F16J 15/38* (2013.01); *F16J 15/008* (2013.01)

(58) Field of Classification Search
CPC .......... F16J 15/38; F16J 15/008; F16J 15/068; F16J 15/164; F16J 15/3448; F16J 15/40; F16J 15/46
See application file for complete search history.

(56) References Cited

U.S. PATENT DOCUMENTS

| | | | |
|---|---|---|---|
| 2,548,412 A * | 4/1951 | Walker | E21B 33/08 277/332 |
| 3,124,502 A * | 3/1964 | Radke | F16J 15/20 428/378 |

(Continued)

FOREIGN PATENT DOCUMENTS

| | | | |
|---|---|---|---|
| CN | 206988432 U | 2/2018 | |
| DE | 933842 C * | 10/1955 | ............... F16J 15/46 |

(Continued)

OTHER PUBLICATIONS

CobaSeal, EagleBurgmann, 2 pages, Jul. 28, 2022, retrieved from Web page <https://www.eagleburgmann.com/en/products/mechanical-seals/compressor-seals/separation-seals/cobaseal>.

(Continued)

*Primary Examiner* — Eugene G Byrd
*Assistant Examiner* — L. Susmitha Koneru
(74) *Attorney, Agent, or Firm* — Maine Cernota & Curran

(57) ABSTRACT

A standstill seal prevents leakage of a process fluid when a shaft is not rotating. The seal includes a flexible band surrounding the shaft that includes a thick, substantially rectangular center region from which thinner side regions extend. Application of pressurized control fluid to a rear surface of the band causes the central region to extend through a gap between cover plates to form a seal with the shaft or an intermediate structure. Depressurizing of the control fluid causes the central region to be withdrawn from the shaft, either entirely due to elasticity of the band, or with (Continued)

the assistance of springs. In various embodiments, the seal is formed radially inward or axially. The side regions can be substantially flat or curved. The standstill seal can be unitary with a rotating shaft seal, and can be upstream or downstream thereof. The control fluid can be the process fluid.

20 Claims, 23 Drawing Sheets

(56) References Cited

U.S. PATENT DOCUMENTS

| | | | |
|---|---|---|---|
| 3,178,779 A * | 4/1965 | Clark | B64C 1/14 |
| | | | 220/232 |
| 3,578,342 A | 5/1971 | Satterthwaite | |
| 3,689,082 A * | 9/1972 | Satterthwaite | F16J 15/46 |
| | | | 277/516 |
| 3,940,152 A * | 2/1976 | Fournier | F16J 15/46 |
| | | | 277/646 |
| 3,985,365 A | 10/1976 | Catanzaro | |
| 4,256,314 A | 3/1981 | Berglund | |
| 4,342,336 A * | 8/1982 | Satterthwaite | F16J 15/46 |
| | | | 277/467 |
| 4,381,114 A * | 4/1983 | Vanderford, Jr. | E21B 33/04 |
| | | | 285/96 |
| 5,209,498 A * | 5/1993 | Colin | E04B 2/82 |
| | | | 277/921 |
| 5,524,905 A * | 6/1996 | Thoman | F16J 15/166 |
| | | | 277/572 |
| 5,890,535 A * | 4/1999 | Petrash | E21B 33/03 |
| | | | 166/88.1 |
| 10,077,621 B2 * | 9/2018 | Gamble | E21B 33/038 |
| 10,316,604 B2 * | 6/2019 | Naedler | E21B 33/1285 |
| 2005/0012281 A1 * | 1/2005 | Ludwig | A61L 2/26 |
| | | | 277/646 |
| 2015/0361816 A1 | 12/2015 | Aksit | |

FOREIGN PATENT DOCUMENTS

| | | |
|---|---|---|
| JP | H06344984 A | 12/1994 |
| JP | H07239039 A | 9/1995 |
| WO | 2016094365 A1 | 6/2016 |

OTHER PUBLICATIONS

CobaDGS—Zero Emission Solution, EagleBurgmann, 4 pages, Jul. 28, 2022, retrieved from Web page <https://www.eagleburgmann.com/en/products/mechanical-seals/compressor-seals/gas-lubricated-seals/cobadgs-br-zero-emission-solution>.

International Search Report and Written Opinion for International Application PCT/IB2023/054584 mail date Aug. 22, 2023, 10 pages.

Extended European Search Report for Application No. 23734440.3 mail date Apr. 30, 2024, 8 pages.

Australian Examination Report No. 1 for Application No. 2023203937 mail date May 23, 2024, 5 pages.

* cited by examiner

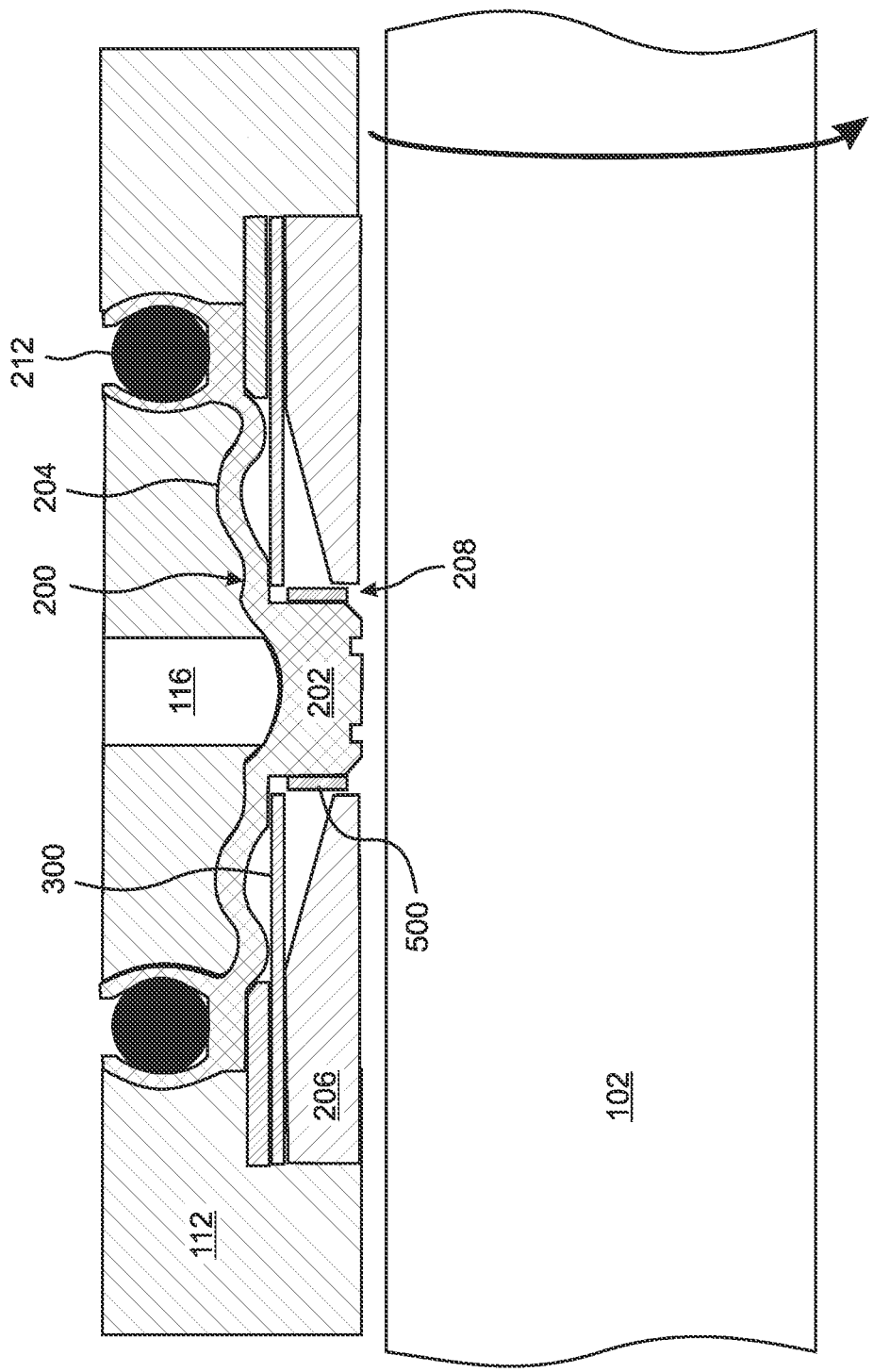

PNEUMATIC STANDSTILL SHAFT SEAL

FIELD OF THE INVENTION

The invention relates to standstill seals, and more particularly, to pressure-driven standstill seals that are applicable for sealing against high pressure differentials.

BACKGROUND OF THE INVENTION

Many rotating shaft seal approaches are known for limiting the escape of a process fluid through a housing that is penetrated by a rotating shaft. One example is a rotating face mechanical seal, which provides a non-contact seal with minimal process fluid leakage, even in the case of highly pressurized gas process fluids. In some cases, grooves or other features are included on at least one face of a rotating face mechanical seal that serve to repel process fluid from the seal when the shaft is rotating.

In many cases, for example when sealing a gas that is toxic or otherwise dangerous to personnel and to the environment, it is desirable to also form a tight seal with a shaft even when the shaft is not rotating. Many rotating shaft seals are inefficient for forming a seal under these "standstill" conditions. Instead, a separate standstill seal can be provided that is withdrawn from the shaft when the shaft is rotating, and pressed against the shaft to form a seal when the shaft is not rotating. Process fluid is thereby prevented from reaching the environment under standstill conditions, either by preventing the process fluid from reaching the rotating shaft seal, or preventing the process fluid from reaching the external environment if it leaks past the rotating shaft seal. Often, a controller is implemented both to control the starting and stopping of the shaft rotation and to control the opening and closing of the standstill shaft seal.

With reference to FIG. 1A one approach is to provide a solid, rigid sealing annulus 100 that surrounds the shaft 102 and can be pressed axially into contact with a radial structure 104 that is sealed to the shaft 102 via a supporting structure 106. In the example of FIG. 1A, the sealing annulus 100 is pneumatically driven against the radial structure 104 when the shaft 102 is not rotating, and is withdrawn from the shaft 102 by a spring 108 when the shaft is rotating. In similar examples, the sealing annulus 100 is driven by a bi-directional pneumatic piston or by mechanical mechanism such as a solenoid. Typically, the standstill shaft seal is activated and deactivated by a controller (not shown), which may be but is not necessarily the same controller that also controls the rotational starting and stopping of the shaft.

While this approach is durable, and is able to seal high pressure process fluids such as high-pressure gasses, nevertheless this approach is intrinsically complex and expensive to manufacture.

With reference to FIGS. 1B and 1C, another approach is to surround the shaft 102 with a hollow, elastomeric tube 110 that is constrained by a housing 112 and is in fluid communication via an inflation inlet 116 with an inflation source (not shown), for example a source of pressurized nitrogen gas. The cross-section of the tube 110 is shaped such that it normally does not extend beyond the housing 112 to the shaft 102. However, when the interior 114 of the tube 110 is pressurized by the inflation source, it expands radially inward beyond the housing 112 and forms a seal both with the housing 112 and with the shaft 102. FIG. 1B illustrates the standstill shaft seal when it is open, and FIG. 1C illustrates the seal when it is closed.

The approach of FIGS. 1B and 1C is simple, and relatively easy to manufacture. However, it can be difficult to provide complex cross-sectional shaping to the tube 110, because it is typically extruded rather than cast.

With reference to FIGS. 1D and 1E, in a similar approach a shaped elastomeric band 118 is snapped onto a supporting form 120 and installed within the housing 112. The supporting form 120 is penetrated by the inflation inlet 116, which is directed to a rear surface of the band 118. With reference to FIG. 1D, when no pressure is applied via the inflation inlet 116, the elastomeric band 118 remains flat against the supporting form 120, and does not extend beyond the housing 112. However, with reference to FIG. 1E, when pressure is applied via the inflation inlet 116, a pocket of fluid is formed between the band 118 and the supporting form 120, such that the band 118 is extended radially inward out of the housing 112 and is pressed against the shaft 102, forming a seal.

While these approaches can be effective under some circumstances, they are apt to fail when attempting to form a seal against a high-pressure fluid, such as a gas that is pressurized to 70 Bar or 90 Bar. With reference to FIG. 1F, if the seal is closed, and a very high pressure is applied by the process fluid upstream of the seal, with no corresponding pressure downstream of the seal, the elastomeric seal 118 can be distorted and even extruded 122 into the gap between the shaft 102 and the housing 112, such that the band 118 may not fully withdraw from the shaft 102 when the pressure applied via the inflation inlet 116 is withdrawn. In such cases, it may be necessary to resort to a rigid, mechanical approach such as is illustrated in FIG. 1A.

What is needed, therefore, is a standstill shaft seal that is simple in design, relatively low cost to produce, and able to form a seal that reliably withstands high pressure process fluids.

SUMMARY OF THE INVENTION

The present invention is a fluid pressure driven standstill shaft seal that is simple in design, relatively low cost to produce, and able to form a seal that reliably withstands high pressure process fluids, such as process gasses pressurized to 70 Bar or higher.

The disclosed seal comprises a flexible band that is installed within an annular housing and surrounds a rotatable shaft. The flexible band comprises a thick, substantially rectangular central region flanked by thinner side regions on either side thereof. The thinner side regions of the flexible band provide radial or axial flexibility to the central region, such that the thick central region is able to be extended through an annular opening in the housing and then retracted therefrom. The thickness of the central region enables it to resist being distorted or extruded when it is pressed against the shaft and subject to a high fluid pressure differential. Pressurized control fluid is applied behind the central region via a control fluid inlet to close the standstill seal.

The pressurized control fluid that is applied behind the flexible band is controlled by a controller, which in embodiments also controls the rotation of the shaft. While the shaft is rotating, no pressure is applied behind the central region of the flexible band, such that it remains partially or fully within the annular housing and does not contact the shaft. When the shaft is not rotating (i.e. is in a standstill condition), fluid pressure is applied by the controller behind the central region of the flexible band via the control fluid inlet. As a result, the central region of the flexible band is pushed through the annular opening in the housing, and is pressed against the shaft, or against an intermediate structure that is sealed to the shaft, forming a standstill seal therewith. In radial embodiments the change in diameter of the central region is only a small percentage of the full diameter of the flexible band, such that the central region is easily able to accommodate the circumferential compression that is required as the central region is pressed radially inward toward the shaft.

In some embodiments, the source of the control fluid is independent of the process, and can be, for example, a source of pressurized nitrogen gas, pressurized air, or a pressurized liquid. In other embodiments, the control fluid is the process fluid. In some of these embodiments, a pressure boosting device is used to increase the pressure of the process fluid that is applied behind the flexible band.

In various embodiments, the flexible band is made from a material such as an elastomer that has sufficient elasticity to reliably spring back to its original shape when it is no longer distorted by applied fluid pressure, such that when the applied fluid pressure is removed, the central region is fully withdrawn from the shaft due to the elasticity of the elastomer. In other embodiments, the flexible band is made from a material that is flexible and durable, but has less elasticity, such as PTFE, such that the flexible band may not have sufficient elasticity to reliably withdraw the central region from the shaft when the control fluid pressure is withdrawn. Some of these embodiments include a pair of annular, toothed springs, each of which has a solid annular region that is clamped in place within the housing, and a toothed annular region that is beneath at least a portion of the side regions of the flexible band. The toothed springs provide added return force that ensures full withdrawal of the central region from the shaft.

Embodiments further include a pair of rigid annular rings on either side of the thick central region which completely eliminate the possibility that any of the thick region might be extruded into the gap between the housing and the shaft when the standstill seal is engaged. The annular rings can be attached to the central region of the flexible band or they can be fixed to the housing and extend into the gap between the shaft and the housing.

The standstill seal of the present invention can be implemented together with at least one rotating shaft seal, such as a rotating face mechanical seal. The standstill seal can be implemented upstream or downstream of the rotating shaft seal. Or, if a plurality of rotating shaft seals are included, then the standstill seal can be implemented between the rotating shaft seals. In some embodiments, a plurality of the disclosed standstill seals are deployed, for example one upstream of the rotating shaft seal and one downstream of the rotating shaft seal.

While the disclosed standstill seal is sometimes described herein as acting radially inward, it will be clear to those of skill in the art that in other embodiments the stationary seal is axial. For example, in embodiments the central region of the flexible band is pressed axially against a radially extending face that is fixed and sealed by an intermediate support structure to the rotating shaft.

The present invention is a standstill seal configured to form a seal with a rotatable shaft so as to prevent leakage of a process fluid past the standstill seal when the shaft is not rotating. The standstill seal includes a flexible band surrounding the shaft, the flexible band comprising a relatively thicker central region from which relatively thinner side regions extend longitudinally, the central region being substantially rectangular in cross section, a housing configured to house the flexible band, a pair of cover plates underlying the side regions of the flexible band and configured to prevent the side regions from being deflected past the cover plates, a gap being provided between the cover plates through which the central region of the flexible band can be extended, a control fluid inlet configured to provide fluid communication between a source of pressurized control fluid and a rear surface of the flexible band, and a controller.

The standstill seal is configured, when the controller applies the pressurized control fluid to the control fluid inlet, to extend the central region of the flexible band through the gap such that it makes contact and forms a seal with the shaft, or with an intermediate structure that is sealed to the shaft. The standstill seal is also configured, when the controller ceases to apply the pressurized control fluid to the flexible band, to withdraw the central region of the flexible band away from the shaft or intermediate structure.

In embodiments, the standstill seal is configured to apply the central region of the flexible band radially inward against the shaft or against the intermediate structure.

In any of the above embodiments, the standstill seal can be configured to apply the central region of the flexible band axially against the intermediate structure.

Any of the above embodiments can further include a pair of rigid annular support rings configured to support sides of the central region of the flexible band when the central region is extended through the gap between the cover plates.

In any of the above embodiments, the standstill seal can be configured to apply the central region of the flexible band radially inward against the shaft or the intermediate structure, and the annular support rings can include ring gaps that enable the annular support rings to compress radially when the central region is extended radially inward against the shaft or the intermediate structure. In some of these embodiments, the annular support rings are fixed to the central region of the flexible band. And in any of these embodiments, the annular support rings can extend from the housing.

In any of the above embodiments, the flexible band can include sufficient elasticity to cause the central region to be withdrawn from the shaft or intermediate structure when the controller ceases to apply the pressurized control fluid to the flexible band.

Any of the above embodiments can further include a spring that is configured to assist the withdrawal of the central region of the flexible band from the shaft or intermediate structure when the controller ceases to apply the pressurized control fluid to the flexible band.

In some of these embodiments, the standstill seal is configured to apply the central region of the flexible band radially inward against the shaft or the intermediate structure.

In some of these embodiments, the spring comprises a pair of spaced apart annular bands having solid annular portions from which teeth extend axially toward each other beneath the side regions of the flexible band, an axial gap being provided between the teeth through which the central region of the flexible band can be extended to contact the shaft or the intermediate structure, the teeth being bent radially inward as the central region of the flexible band is pushed toward the shaft. In some of these embodiments, the standstill seal further comprises a pair of rigid annular support rings that extend radially inward from the springs, the rigid annular support rings being configured to support sides of the central region of the flexible band when the central region is applied radially inward against the shaft or the intermediate structure.

In other of these embodiments, the standstill seal comprises a pair of rigid annular support rings that support opposing sides of the central region of the flexible band when the central region is extended through the gap between the cover plates, the support rings including circumferential gaps enabling radially inward compression of the support rings, and the springs are compression springs applied to the gaps in the support rings.

In other embodiments that include a spring that is configured to assist the withdrawal of the central region of the flexible band from the shaft or intermediate structure when the controller ceases to apply the pressurized control fluid to the flexible band, the standstill seal is configured to apply the central region of the flexible band axially against the intermediate structure, and the spring comprises a pair of radially concentric annular disks having solid annular portions from which teeth extend radially inward and outward toward each other beneath the side regions of the flexible band, a radial gap being provided between the radially inward and radially outward teeth through which the central region of the flexible band can be extended to contact the intermediate structure, the teeth being bent axially as the central region of the flexible ban dis pushed toward the shaft.

In any of the above embodiments, the side regions of the flexible band can include portions that are curved in longitudinal cross section, thereby enabling extension of the side regions when the central region is extended through the gap.

In any of the above embodiments, the standstill seal can be unitary with a rotating shaft seal that is configured to form a seal with the shaft when the shaft is rotating. In some of these embodiments, the standstill seal is configured to form a seal with the shaft or intermediate structure upstream of the rotating shaft seal, while in other of these embodiments the standstill seal is configured to form a seal with the shaft or intermediate structure downstream of the rotating shaft seal.

In any of the above embodiments, the control fluid can be a gas, or the control fluid can be the process fluid.

And in any of the above embodiments, the controller can be configured to start and stop the rotation of the shaft, as well as controlling the application of the pressurized control fluid to the flexible band.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5A is an axial cross-sectional view of an embodiment similar to FIG. 3A, but further including a pair of rigid support rings attached to the central region of the flexible band and configured to support sides of the central region of the flexible band;

DETAILED DESCRIPTION

The present invention is a fluid pressure driven standstill shaft seal that is simple in design, relatively low cost to produce, and able to form a seal that reliably withstands high pressure process fluids, such as process gasses pressurized to 70 Bar or higher.

Figure 1A:
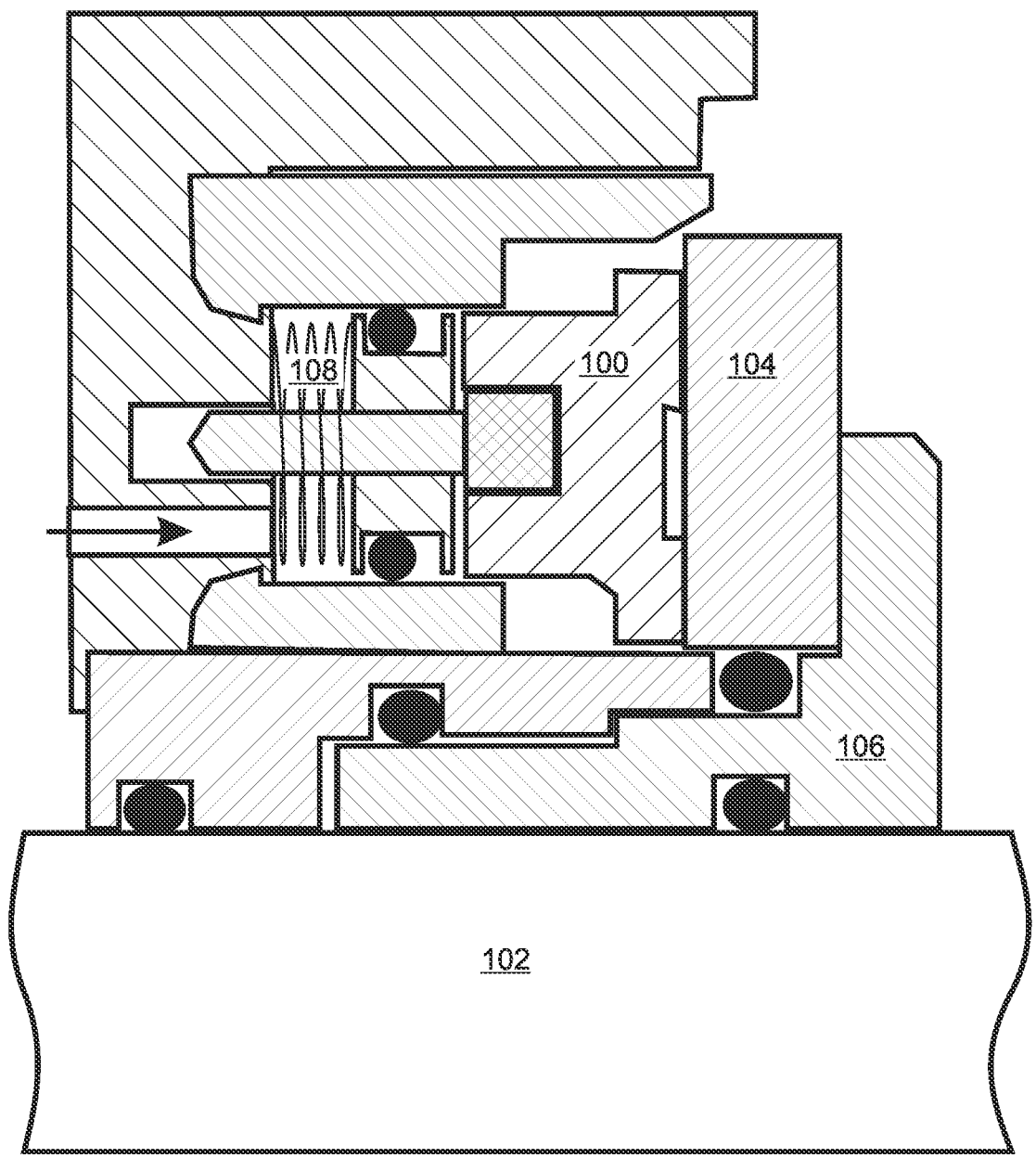
FIG. 1A is a cross-sectional view of a standstill seal of the prior art that presses a rigid sealing element against an intermediate structure.
Figure 1B:
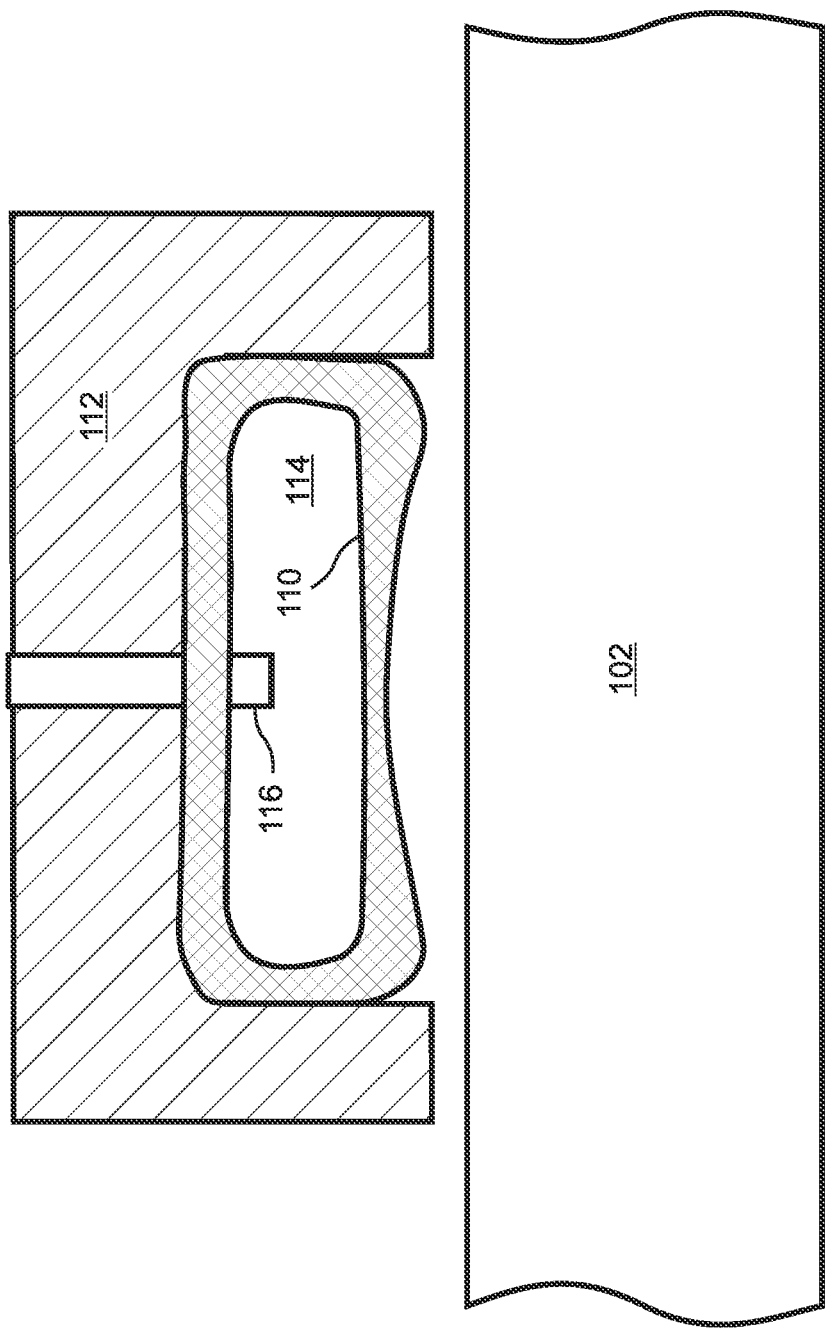
FIG. 1B is a cross-sectional view of a standstill seal of the prior art that forms a seal by inflating a hollow tube to press against a shaft or intermediate structure, the seal being shown in its open configuration.
Figure 1C:
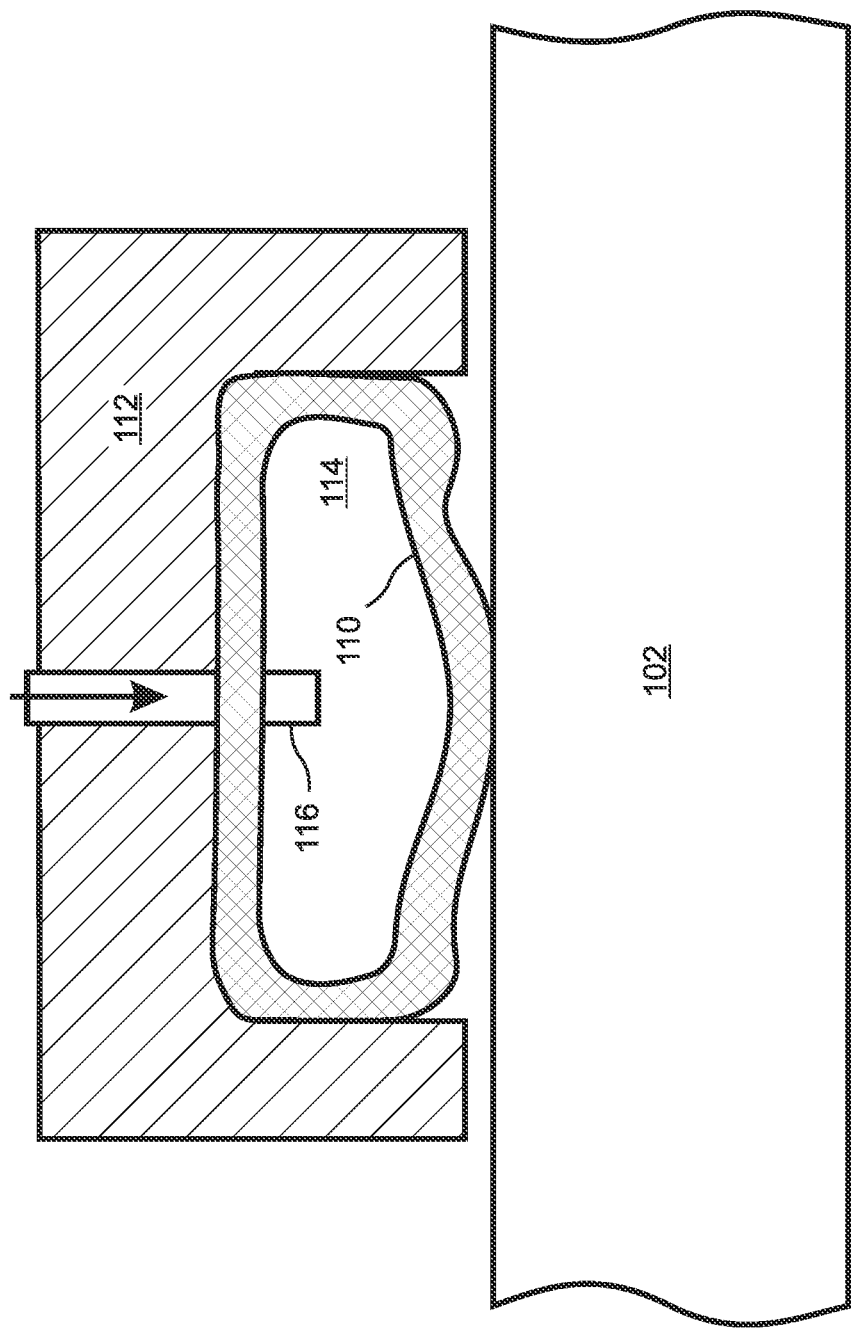
FIG. 1C is a cross-sectional view of the prior art seal of FIG. 1B, shown in its closed configuration.
Figure 1D:
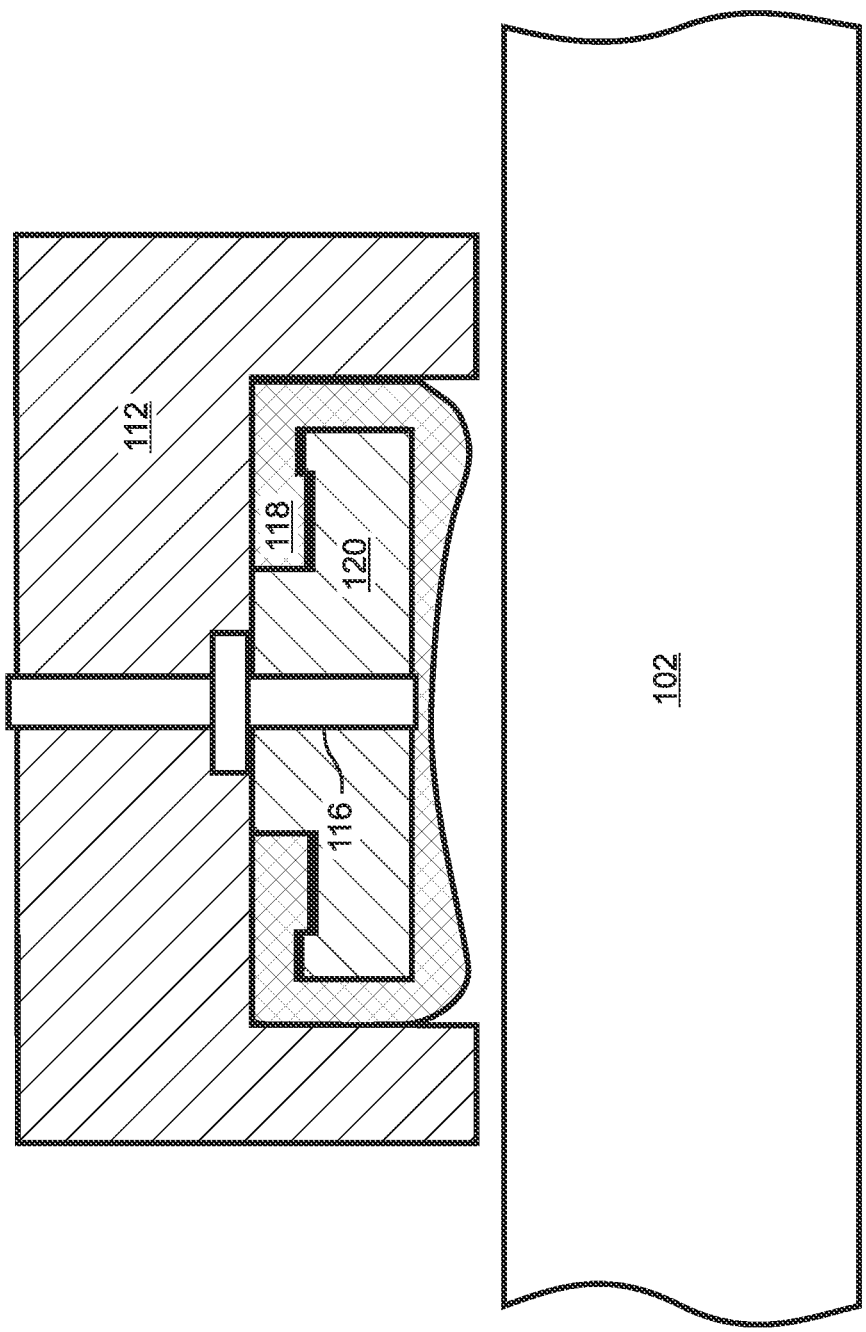
FIG. 1D is a cross-sectional view of a standstill seal of the prior art that includes a thin, shaped elastomeric band that is snapped onto a supporting form, the seal being shown in its open configuration.
Figure 1E:
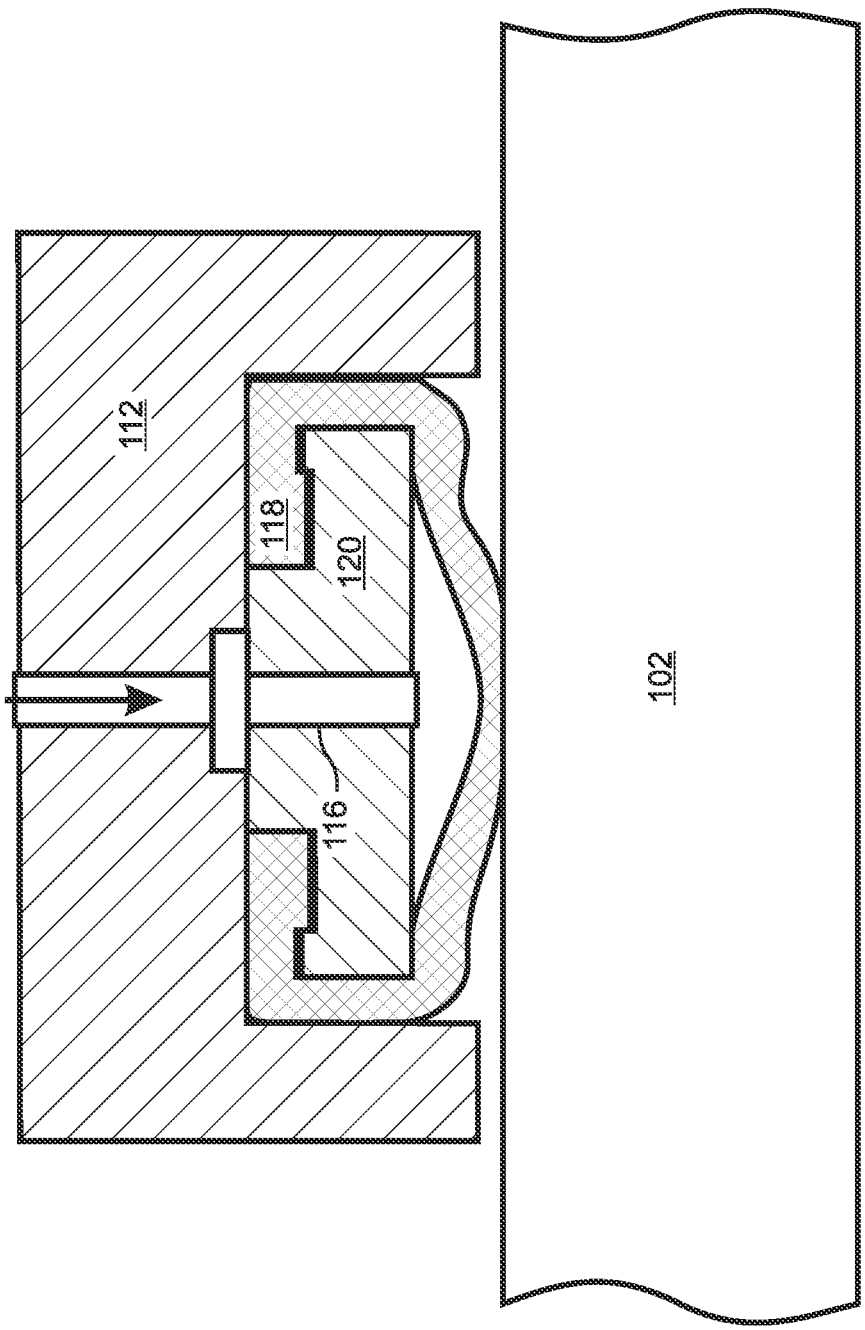
FIG. 1E is a cross-sectional view of the prior art seal of FIG. 1D, shown in its closed configuration.
Figure 1F:
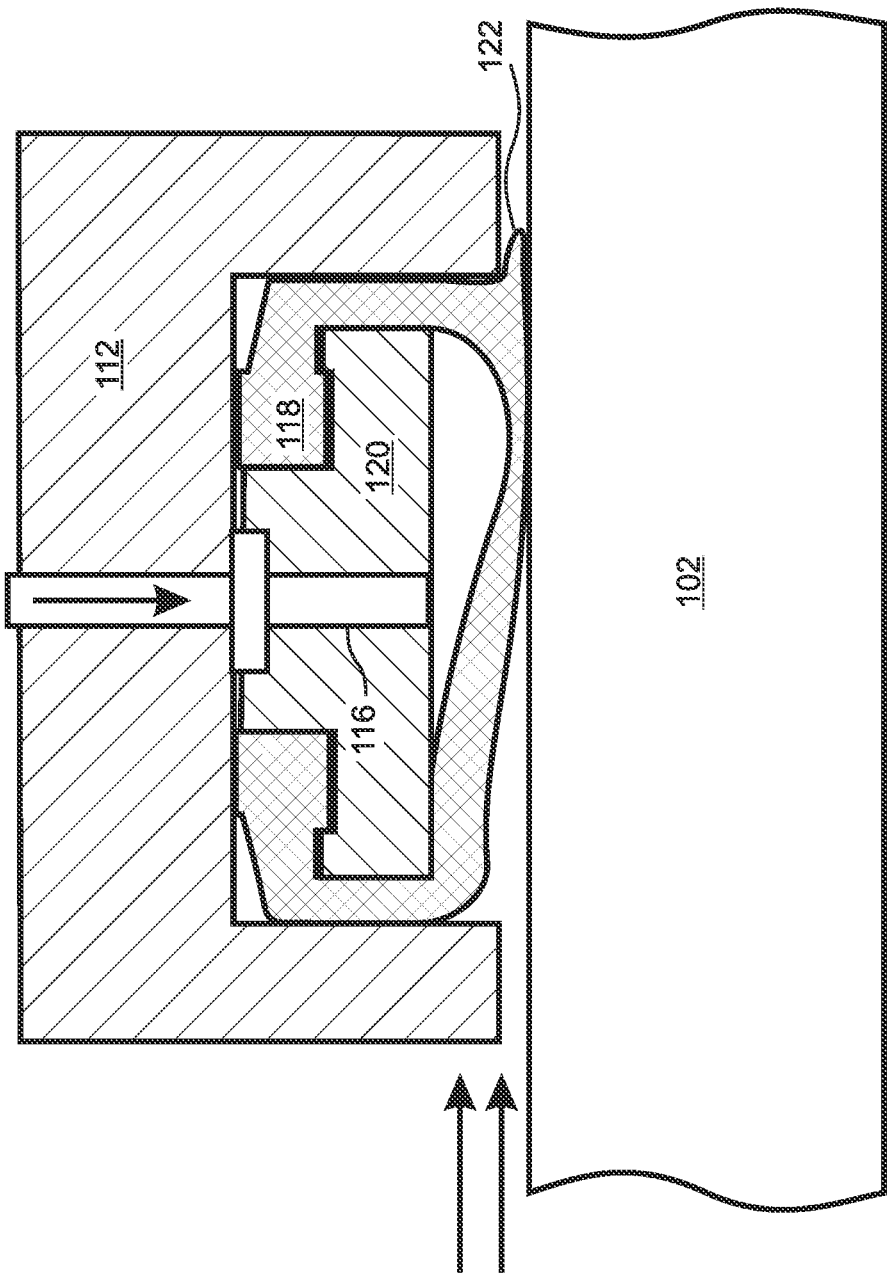
FIG. 1F is a cross-sectional view of the prior art seal of FIG. 1E, wherein the elastomeric band has been extruded into a gap between the shaft and the seal housing due to a pressure differential.
Figure 2A:
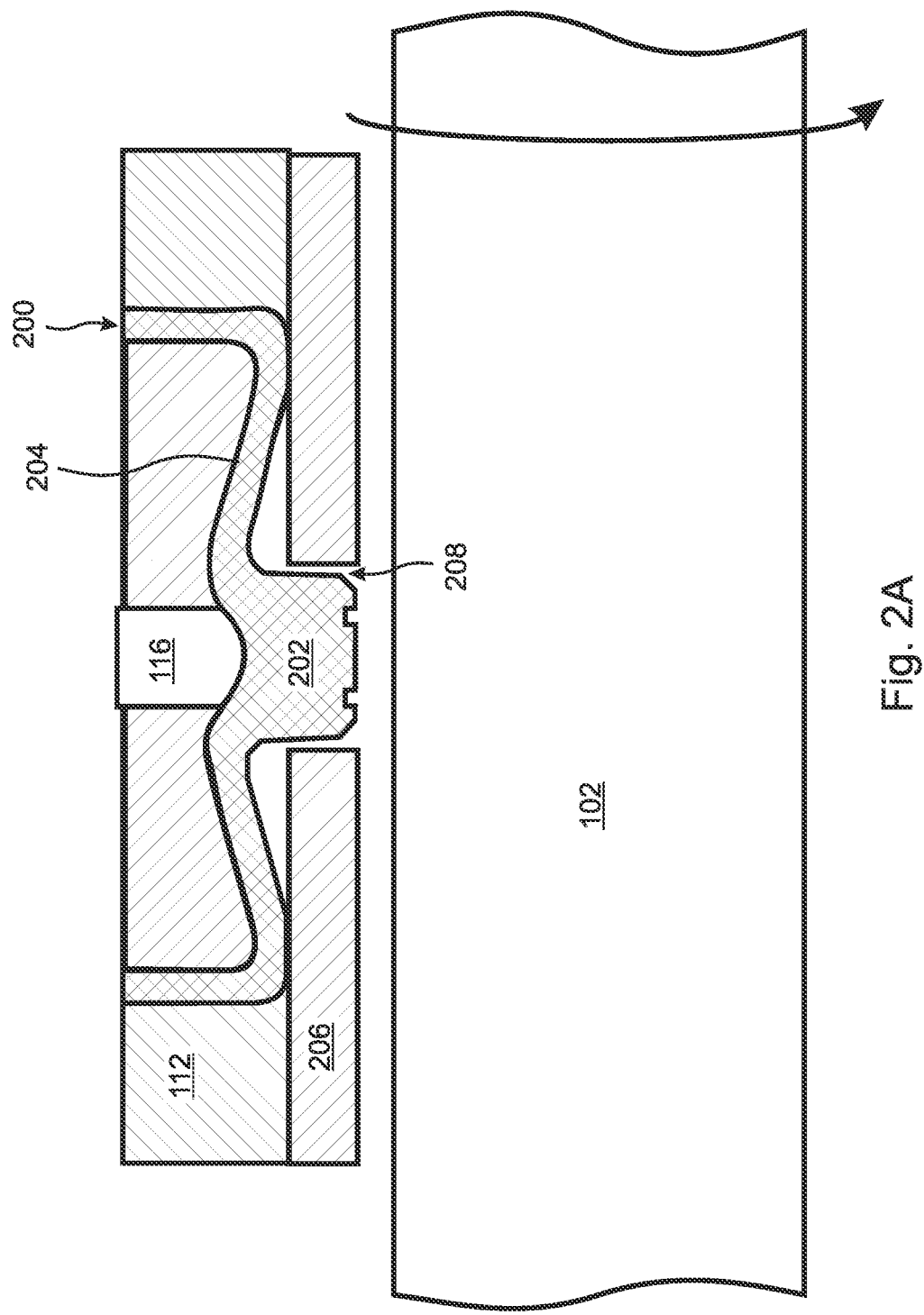
FIG. 2A is an axial cross-sectional view of an embodiment of the present invention in which the seal is opened by radially withdrawing the central region of the flexible band from the shaft due entirely to elasticity of the flexible band, the seal being shown in its open configuration.

With reference to the cross-sectional illustration of FIG. 2A, the disclosed standstill seal comprises a flexible band 200 that is installed within an annular housing 112 and covered by a pair of annular cover plates 206. The flexible band 200, the housing 112, and the cover plates 206 all surround a rotatable shaft 102. The flexible band 200 comprises a thick, substantially rectangular central region 202 flanked by thinner side regions 204 on either side thereof. In the embodiment of FIG. 2A, the thinner side regions 204 of the flexible band 200 provide radial flexibility to the central region 202, such that the thick central region 202 is able to be extended radially inward through an axial gap 208 between the cover plates 206 and then retracted therefrom. The thickness of the central region 202 enables it to withstand high axial pressure differentials when it is pressed against the shaft 102, so that it is not distorted or extruded when the standstill seal is closed.

A pressurized control fluid, such as pressurized nitrogen gas, a pressurized liquid, or pressurized process fluid, is applied behind the central region 202 via a control fluid inlet 116 to close the standstill seal. The pressurized control fluid can be controlled by a controller (not shown), which in embodiments also controls the rotation of the shaft 102. While the shaft 102 is rotating, as is illustrated in FIG. 2A, no pressure is applied behind the central region of the flexible band 200, such that it remains partially or fully within the annular housing 112 and cover plates 206, and does not contact the shaft 102.

Figure 2B:
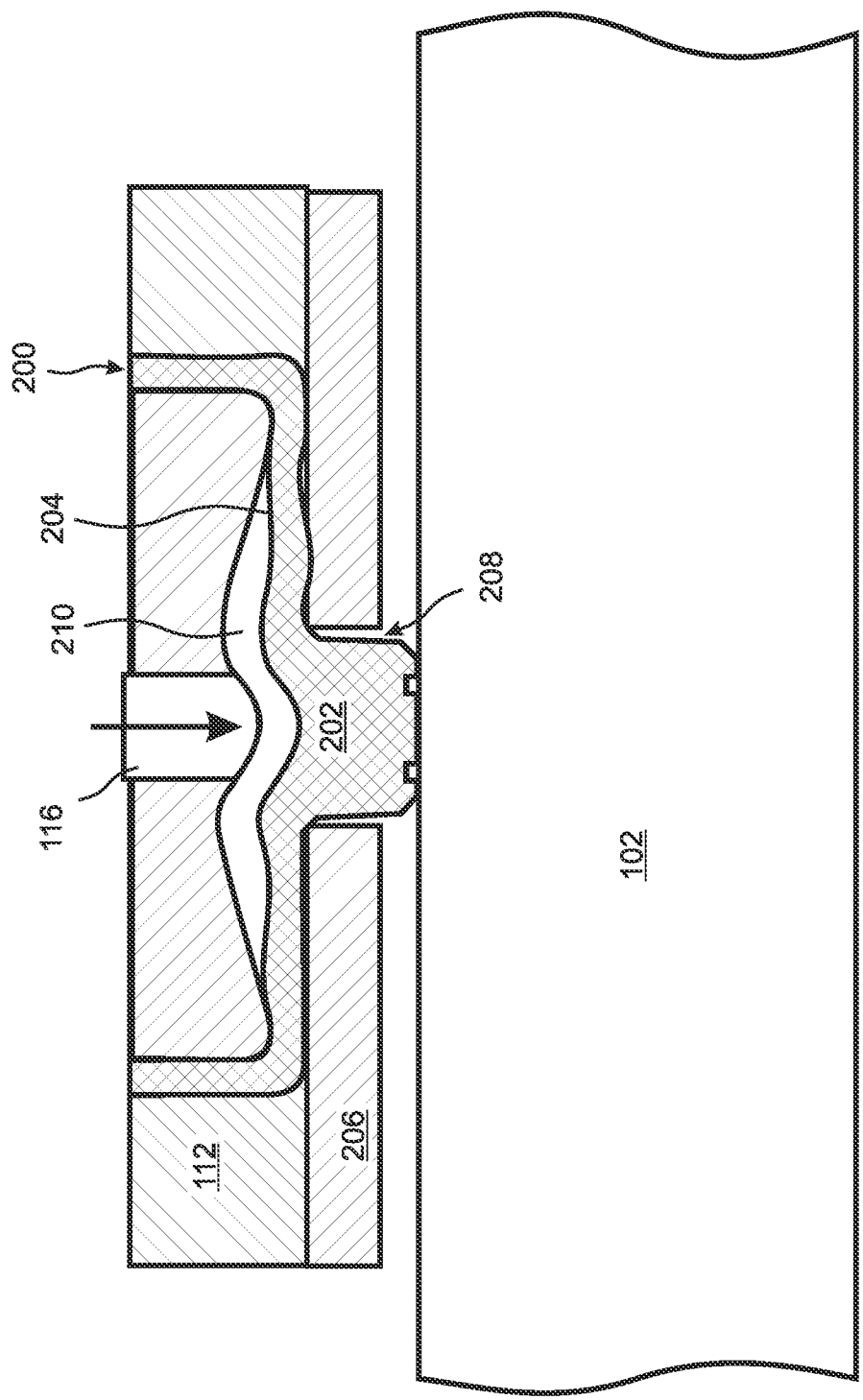
FIG. 2B is an axial cross-sectional view of the embodiment of FIG. 2A shown in its closed configuration.
Figure 7A:
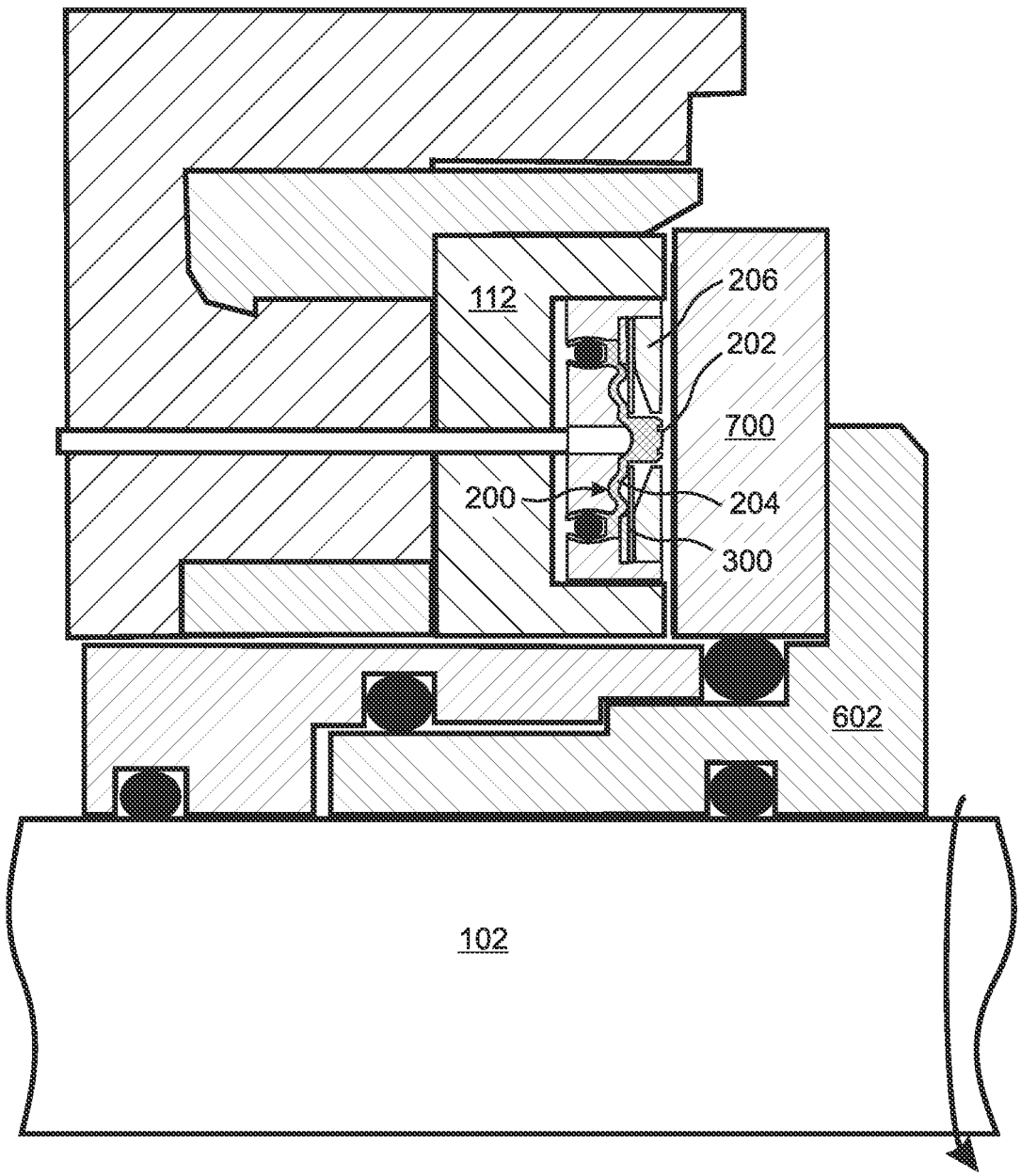
FIG. 7A is an axial cross-sectional view of an embodiment of the present invention in which the seal is closed by pressing the central region of the flexible band axially against an intermediate structure.

With reference to FIG. 2B, when the shaft 102 is not rotating (i.e. is in a standstill condition), pressurized control fluid is applied by the controller behind the central region 202 of the flexible band 200 via the control fluid inlet 116. As a result, in the illustrated embodiment, a gap 210 filled with the pressurized control fluid is formed behind the central region 202 of the flexible band 200, causing the central region 202 of the flexible band 200 to be pushed radially inward through the axial gap 208 between the annular cover plates and pressed against the shaft 102, forming a standstill seal therewith. In other embodiments, the thick central region 202 is pressed axially against an intermediate structure that is sealed to the shaft 102, as is discussed in more detail below with reference to FIG. 7A.

In the radial embodiment of FIGS. 2A and 2B, the change in diameter of the central region 202, when deployed, is only a small percentage of the full diameter of the flexible band 200, such that the central region 202 is easily able to accommodate the circumferential compression that is required as the central region 202 is pressed radially inward toward the shaft 102.

Figure 3A:
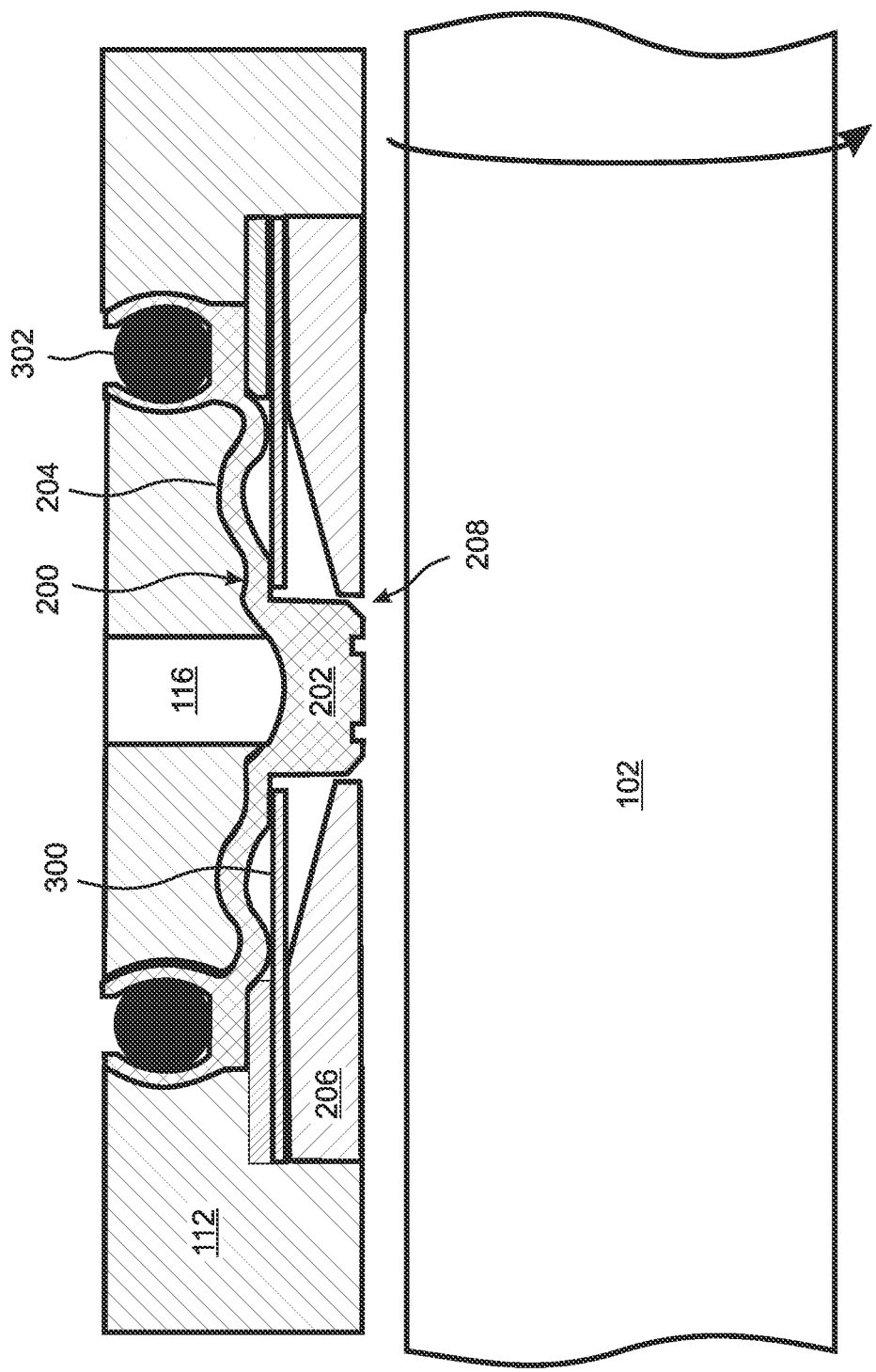
FIG. 3A is an axial cross-sectional view of an embodiment of the present invention in which the radial withdrawal of the central region from the shaft is assisted by springs that include flexible fingers, the seal being shown in its open configuration.
Figure 3B:
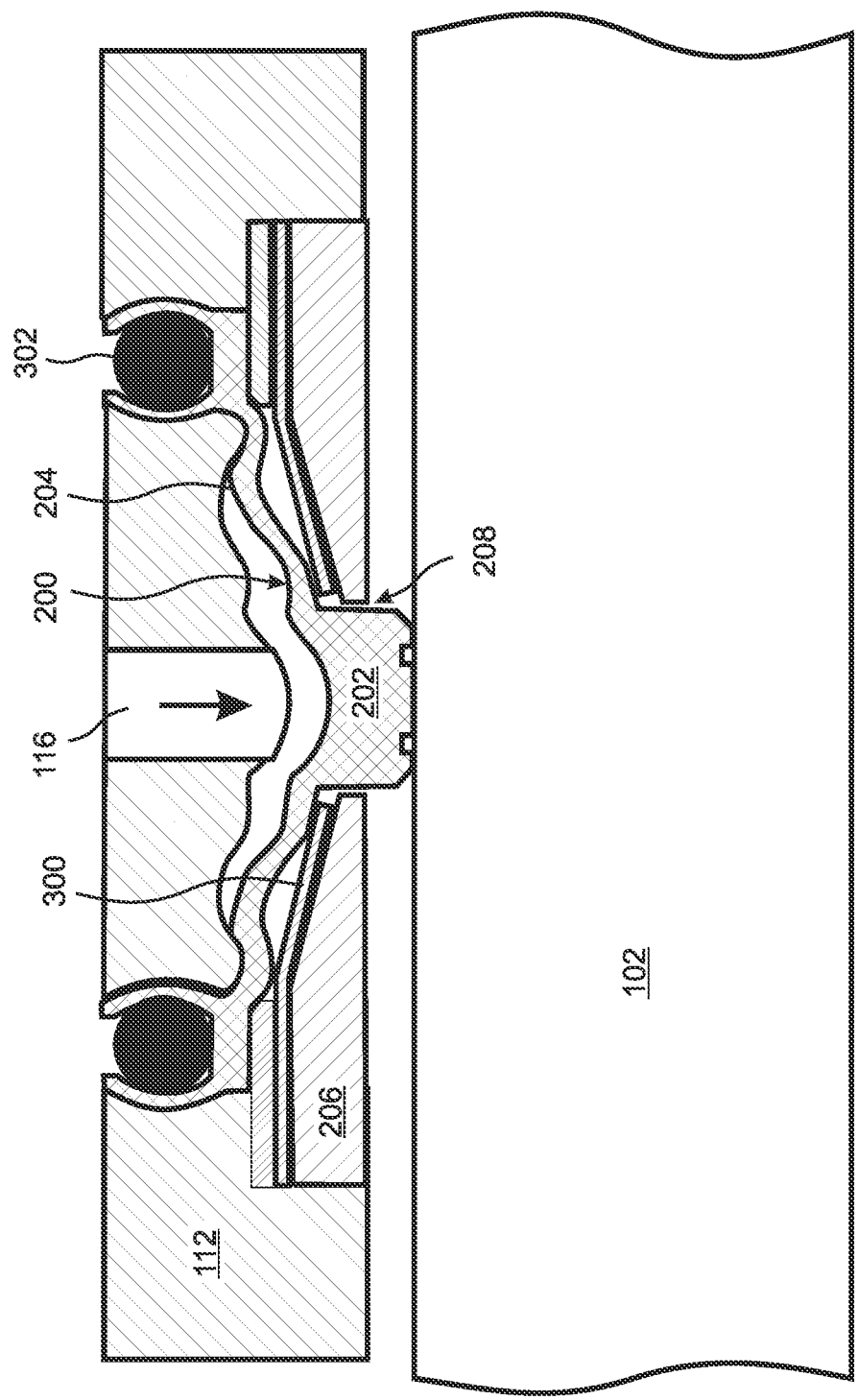
FIG. 3B is an axial cross-sectional view of the embodiment of FIG. 3A shown in its closed configuration.
Figure 3C:
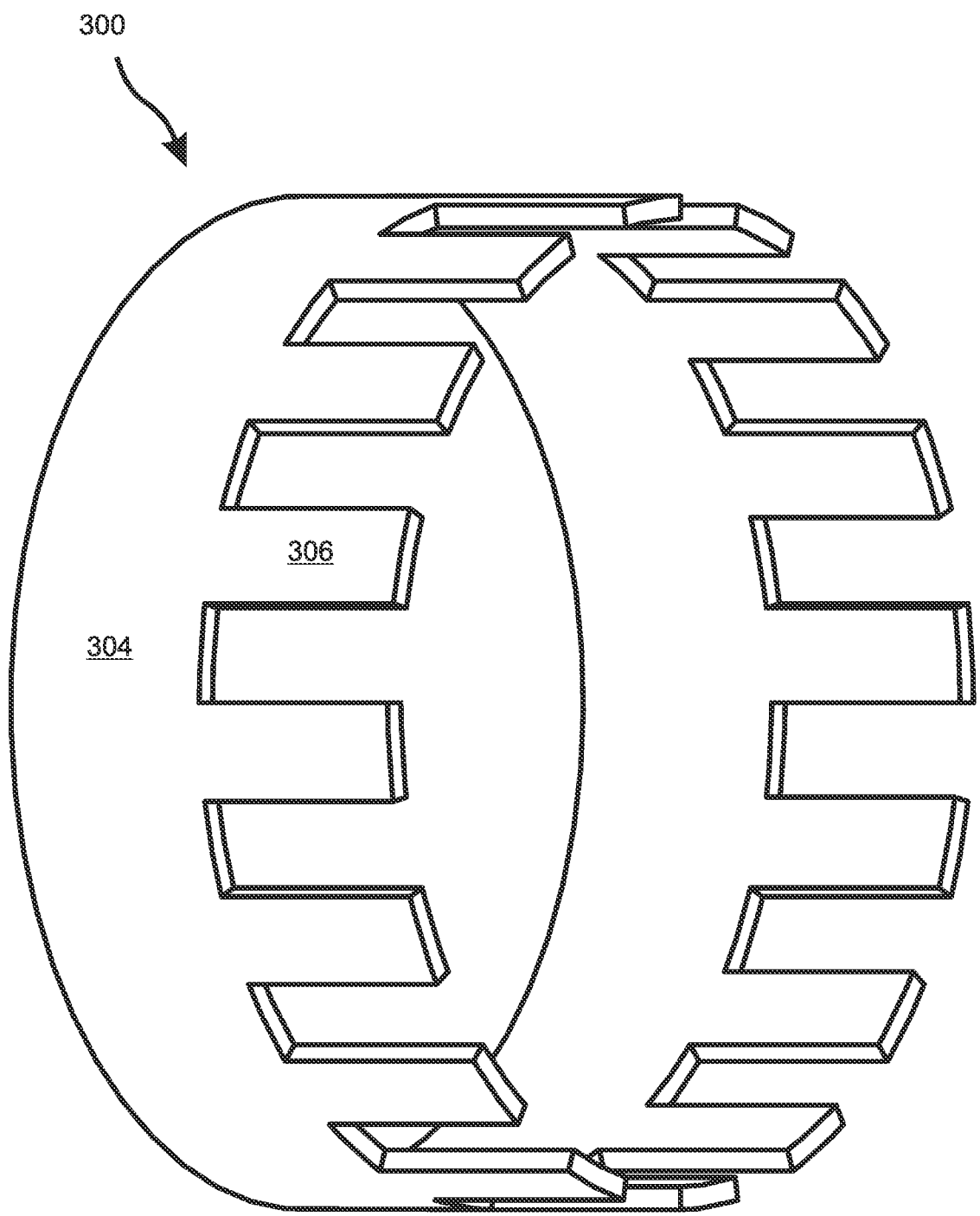
FIG. 3C is a perspective view of one of the springs of FIG. 3A.

In the embodiment of FIGS. 2A and 2B, the flexible band 200 is made from an elastomer or other material that has sufficient elasticity to reliably spring back to its original shape when it is no longer distorted by applied fluid pressure. In the embodiment of FIGS. 3A through 3C, the flexible band 200 is made from a material such as PTFE that is flexible and durable, but has less elasticity, and may not be able, by itself, to reliably withdraw the central region 202 from the shaft 102 when the control fluid pressure is withdrawn.

Accordingly, the embodiment of FIGS. 3A and 3B includes a pair of opposing annular toothed springs 300 that provide added radial return force to the side regions 204 of the flexible band 200, ensuring full withdrawal of the central region 202 from the shaft 102 when the control fluid pressure behind the flexible band 200 is withdrawn. In the illustrated embodiment, the sides 204 of the flexible band 200 are configured so as to be substantially axial when control fluid pressure is not being applied, so that they can rest upon the axially directed teeth 306 of the spring 300. The flexible band is secured within the housing 116 by two O-rings 302.

The curved shaping of the side regions 204 of the flexible band 200 in the embodiment of FIG. 3A provides the additional length that is needed when the standstill seal is closed, as is shown in FIG. 3B. FIG. 3C is a perspective view from the side of one of the springs 300 of FIGS. 3A and 3B. It can be seen that the spring 300 includes a solid annular portion 304 and a ring of axial teeth 306 that can be bent radially inward as the central region 202 of the flexible band 200 is pushed toward the shaft 102.

Figure 4:
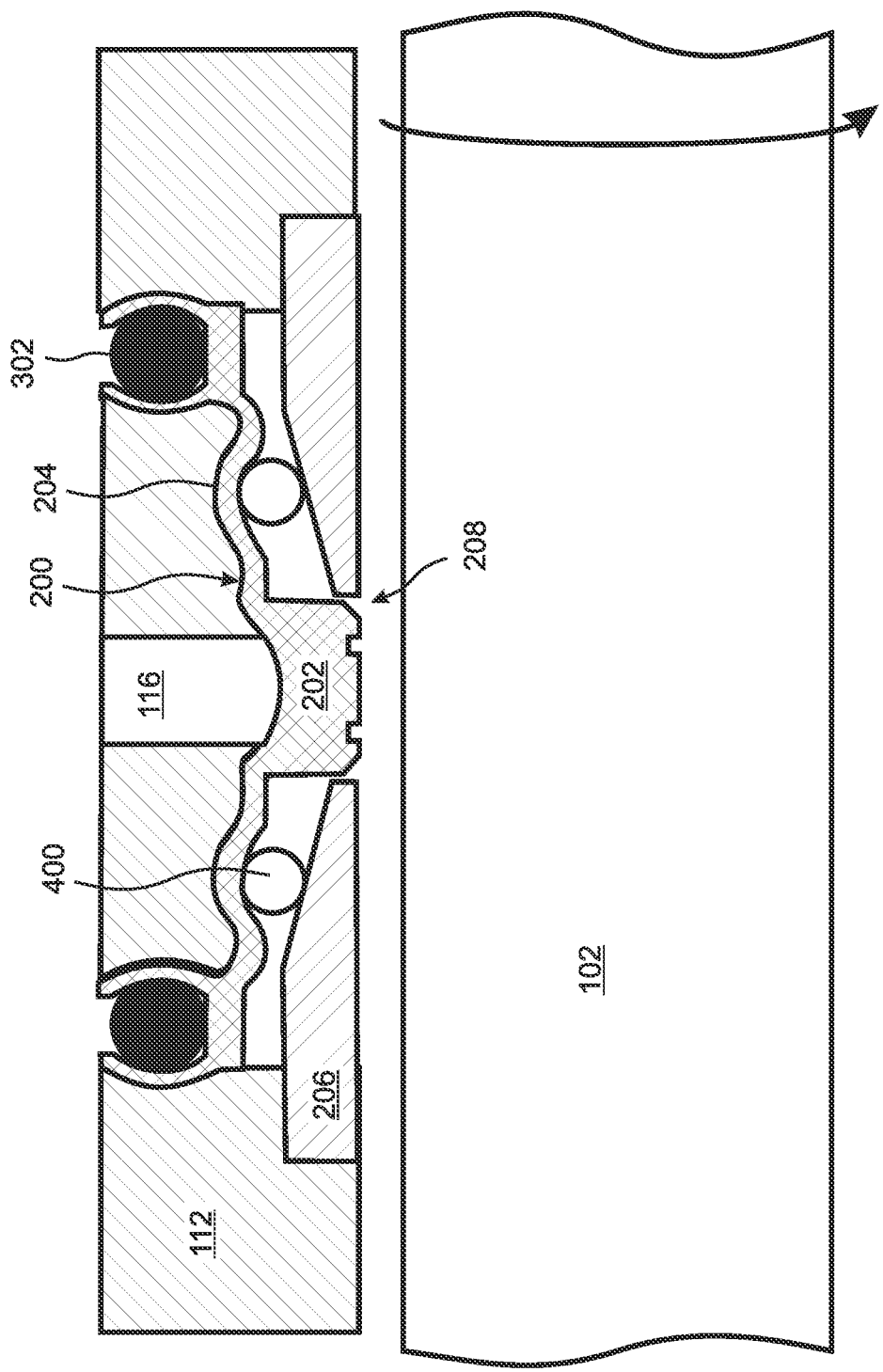
FIG. 4 is an axial cross-sectional view of an embodiment of the present invention in which radial withdrawal of the central region from the shaft is assisted by an elastomeric, compressible tube, the seal being shown in its open configuration.

FIG. 4 illustrates an embodiment that is similar to FIG. 3A, except that the "springs" 400 are elastomeric tubes that surround the shaft 102 within the housing 112 beneath the sides 204 of the flexible band 200. When the central region 202 is deployed, the hollow tubes 400 are flattened, and when the control fluid pressure is released, the elasticity of the hollow tubes 400 assist in returning the central region 202 to its previous position within the housing 112.

With reference to FIGS. 5A, embodiments further include a pair of rigid, annular support rings 500 that are pressed against either side of the thick central region 202 to further support the central region 202 and completely eliminate the possibility that any of the thick central region 202 might be extruded 122 between the annular cover plates 206 and the shaft 102 when the standstill seal is engaged. Of course, the space between the two cover plates 206 is made large enough in these embodiments to accommodate the thicknesses of the support rings 500, as well as the thickness of the central region 202 of the flexible band 200.

Figure 5B:
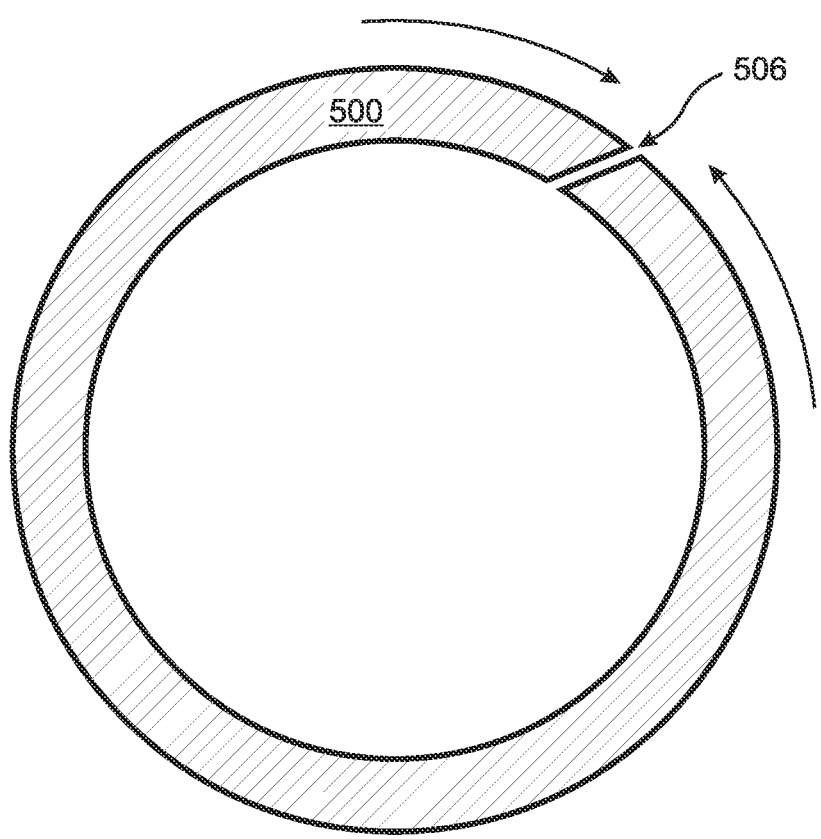
FIG. 5B is a radial cross-sectional view of one of the support rings of FIG. 5A, shown in its open configuration.
Figure 5C:
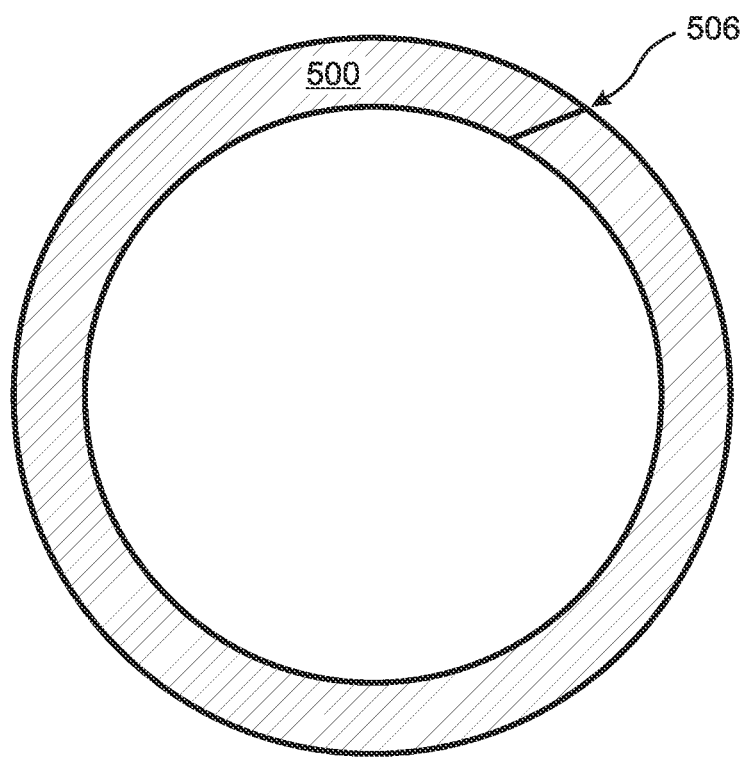
FIG. 5C is a radial cross-sectional view of the support ring of FIG. 5B, shown in its closed configuration.
Figure 5D:
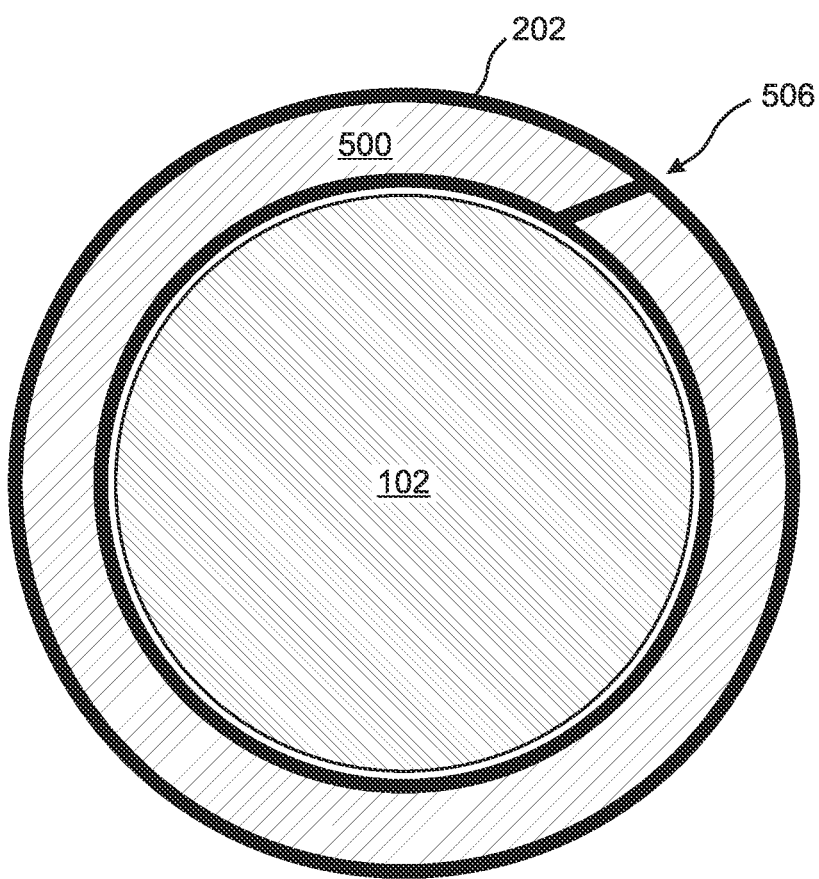
FIG. 5D is a radial cross-sectional view similar to FIG. 5B, but also including the central region of the flexible band.

With reference to FIGS. 5B through 5D, in the illustrated embodiment the annular support rings 500 include gaps 506, such that they do not extend a full 360 degrees about the shaft 102. The gaps 506 enable the support rings 500 to compress radially inward together with the central region 202 of the flexible band 200. In FIG. 5B, a support ring 500 is shown in cross section in its uncompressed state, while in FIG. 5B the support ring 500 is shown in its compressed state. FIG. 5D shows the relationship between the support ring 500 of FIG. 5B and the central region 202 of the flexible band 200.

Figure 5E:
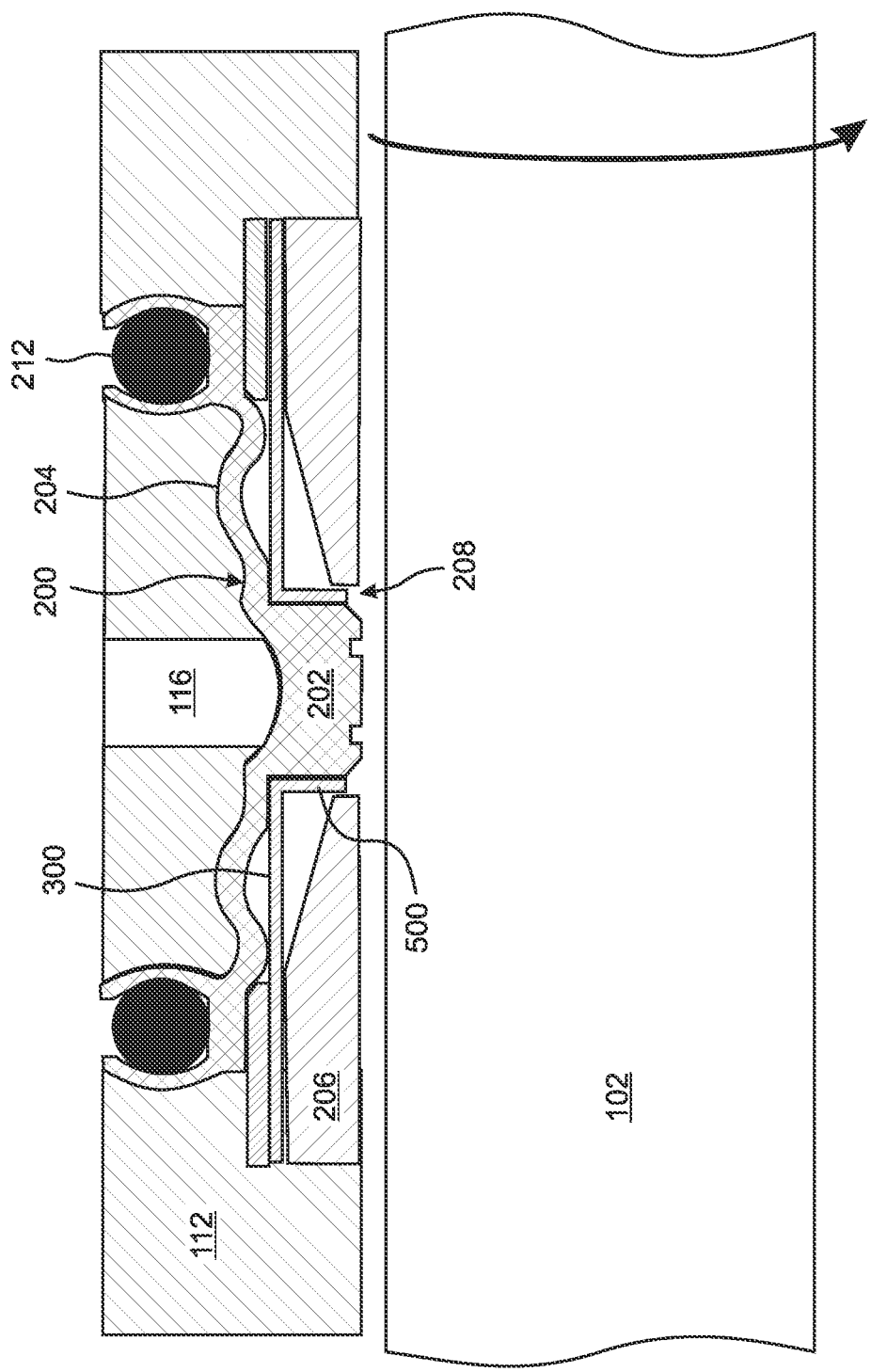
FIG. 5E is an axial cross-sectional view of an embodiment similar to FIG. 5A, but in which the support rings are integral with the springs.

With reference to FIG. 5E, in similar embodiments, the support rings 500 are integral with the springs 300 that assist in reopening the standstill seal when the control fluid is depressurized.

Figure 5F:
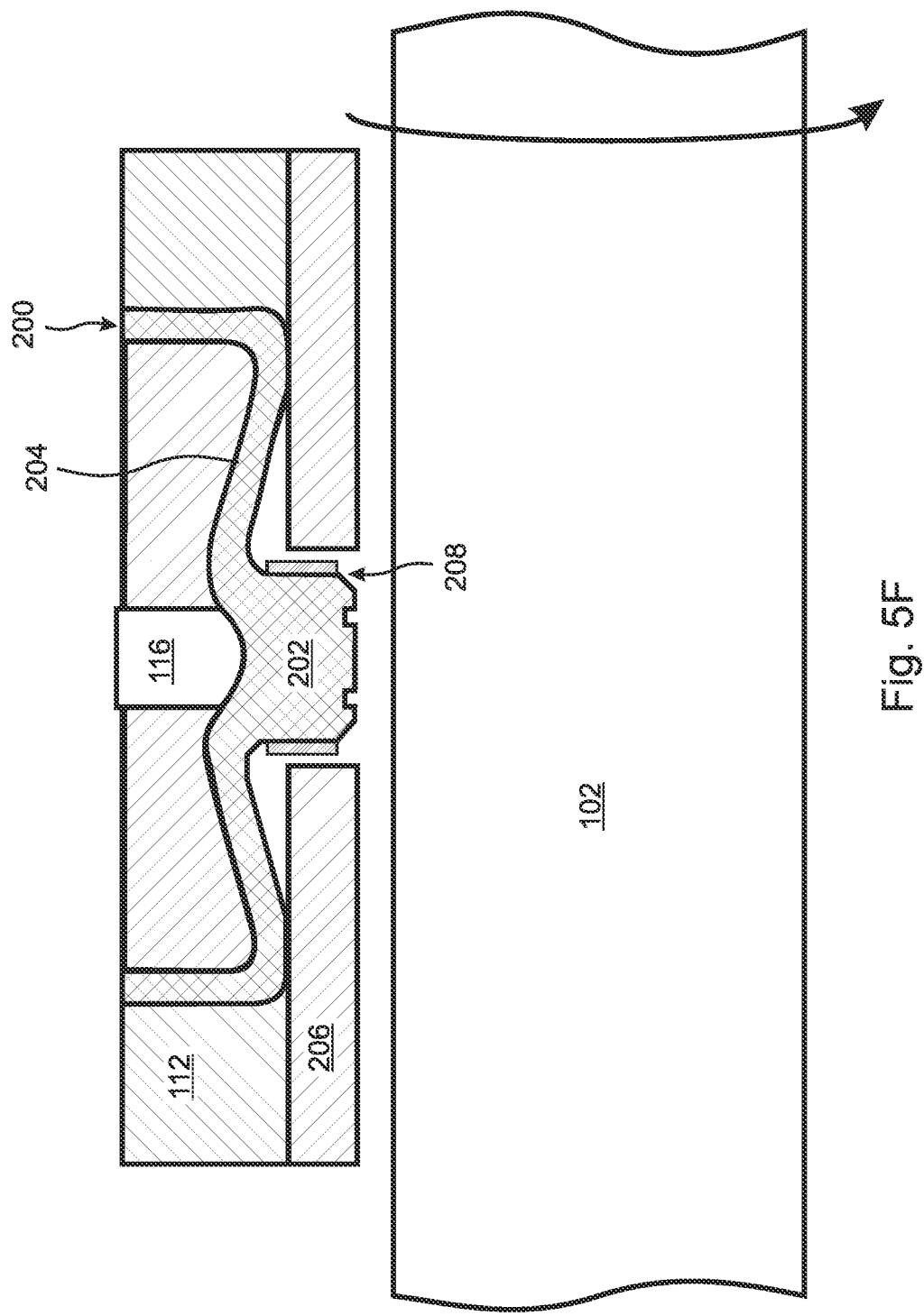
FIG. 5F is an axial cross-sectional view of an embodiment similar to FIG. 2A in which compression springs are used to assist in opening the standstill seal by applying a circumferentially expanding force to the gaps support rings.
Figure 5G:
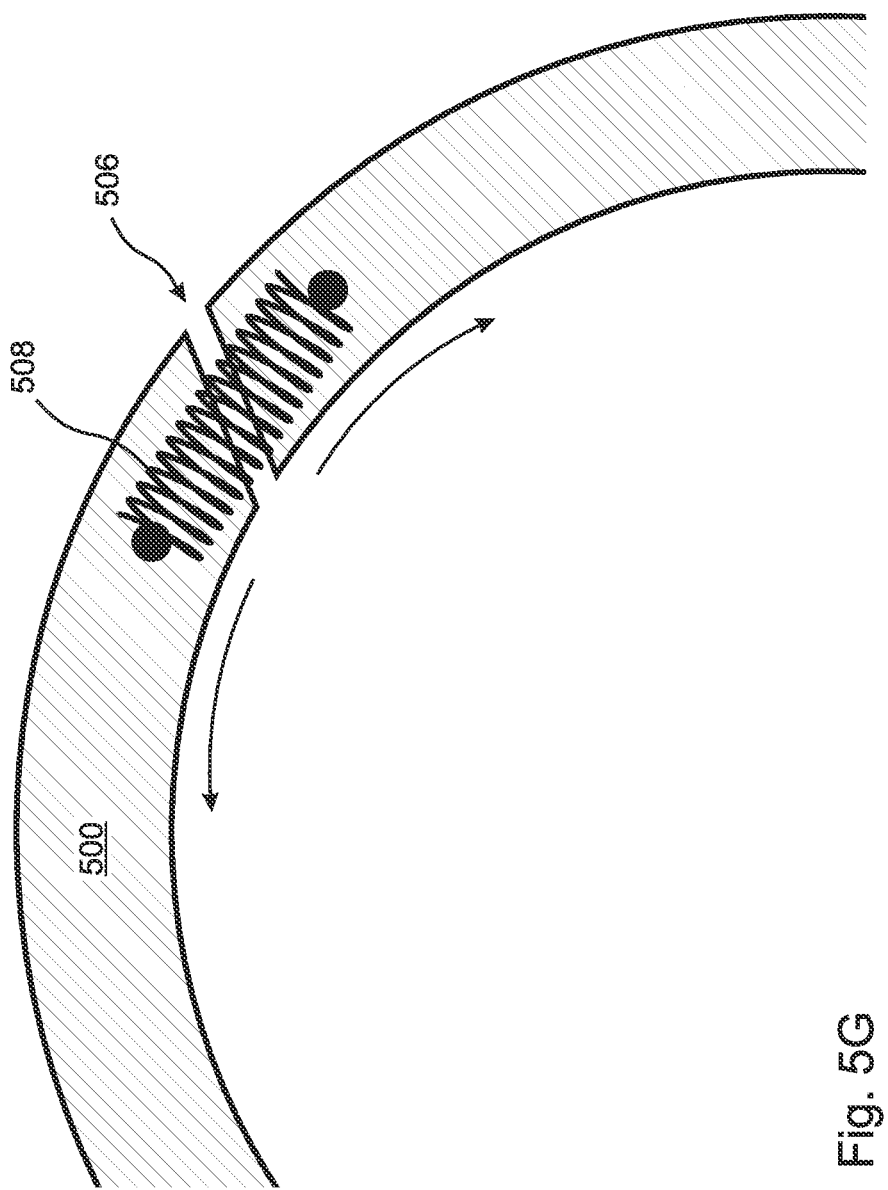
FIG. 5G is a radial cross-sectional view of one of the support rings in the embodiment of FIG. 5F, showing the compression spring that applies the circumferentially expanding force to the gap in the support ring, thereby assisting in opening the standstill seal.

In the embodiment of FIGS. 5F and 5G, a compressible spring 508 is used to assist the opening of the standstill seal when the control fluid is depressurized, rather than toothed springs 300. FIG. 5F is a cross sectional view similar to FIG. 2A, while FIG. 5G is a close-up view of the gap region of a support ring 500 showing the location and action of the spring 508. Instead of applying a "lifting" force to the side regions 204 of the flexible band 200, the compression spring 508 of FIG. 5G applies a circumferentially expanding force to the support rings 500, thereby assisting in the retraction of the central region 202 of the flexible band 200 from the shaft 102.

Figure 5H:
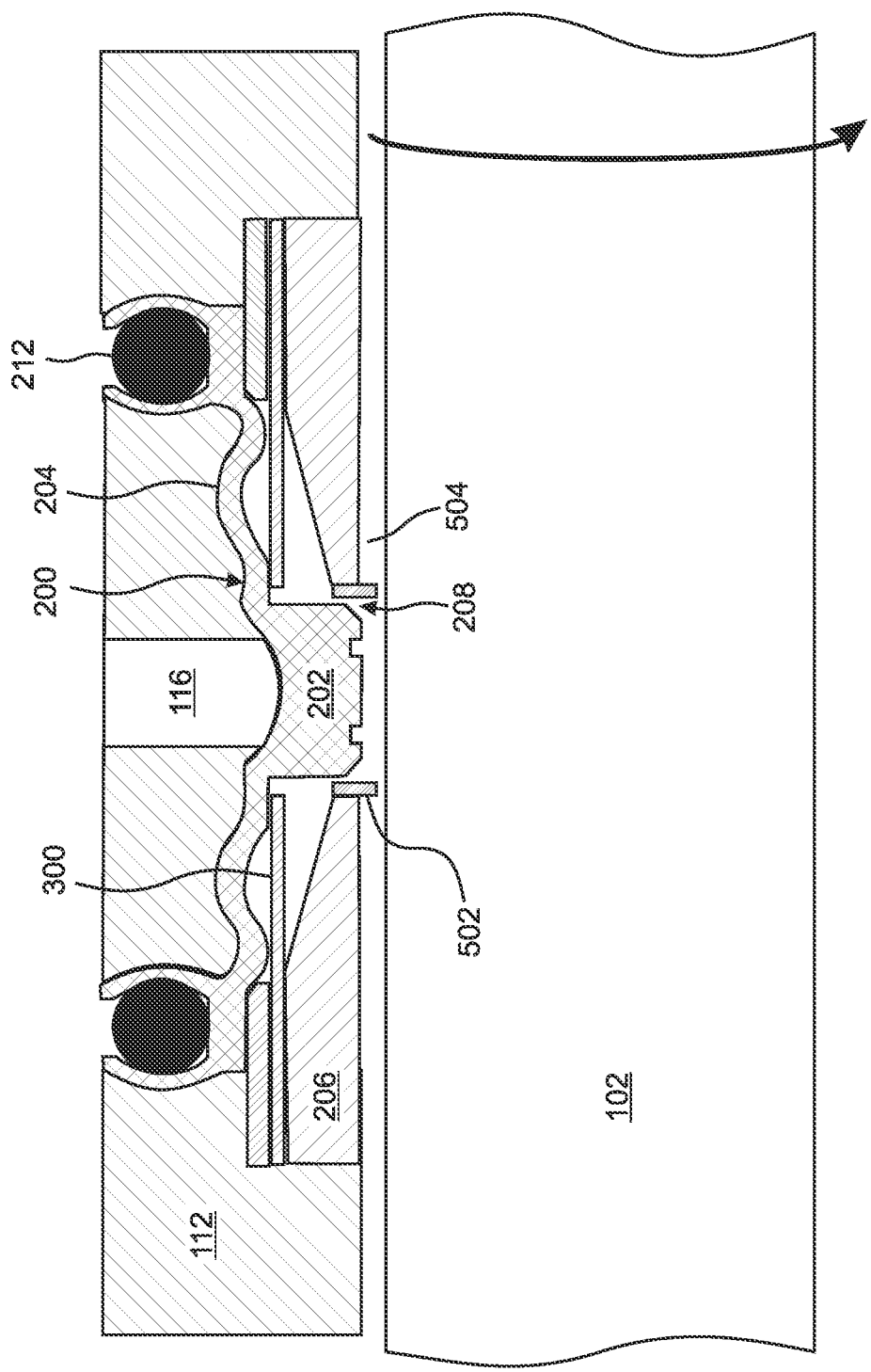
FIG. 5H is an axial cross-sectional view of an embodiment similar to FIG. 5A, but wherein the rigid support rings are fixed to the cover plates

With reference to FIG. 5H, in other embodiments the support rings 502 are fixed to the cover plates 206, and extend into the gap 504 between the shaft 102 and the cover plates 206.

Figure 6:
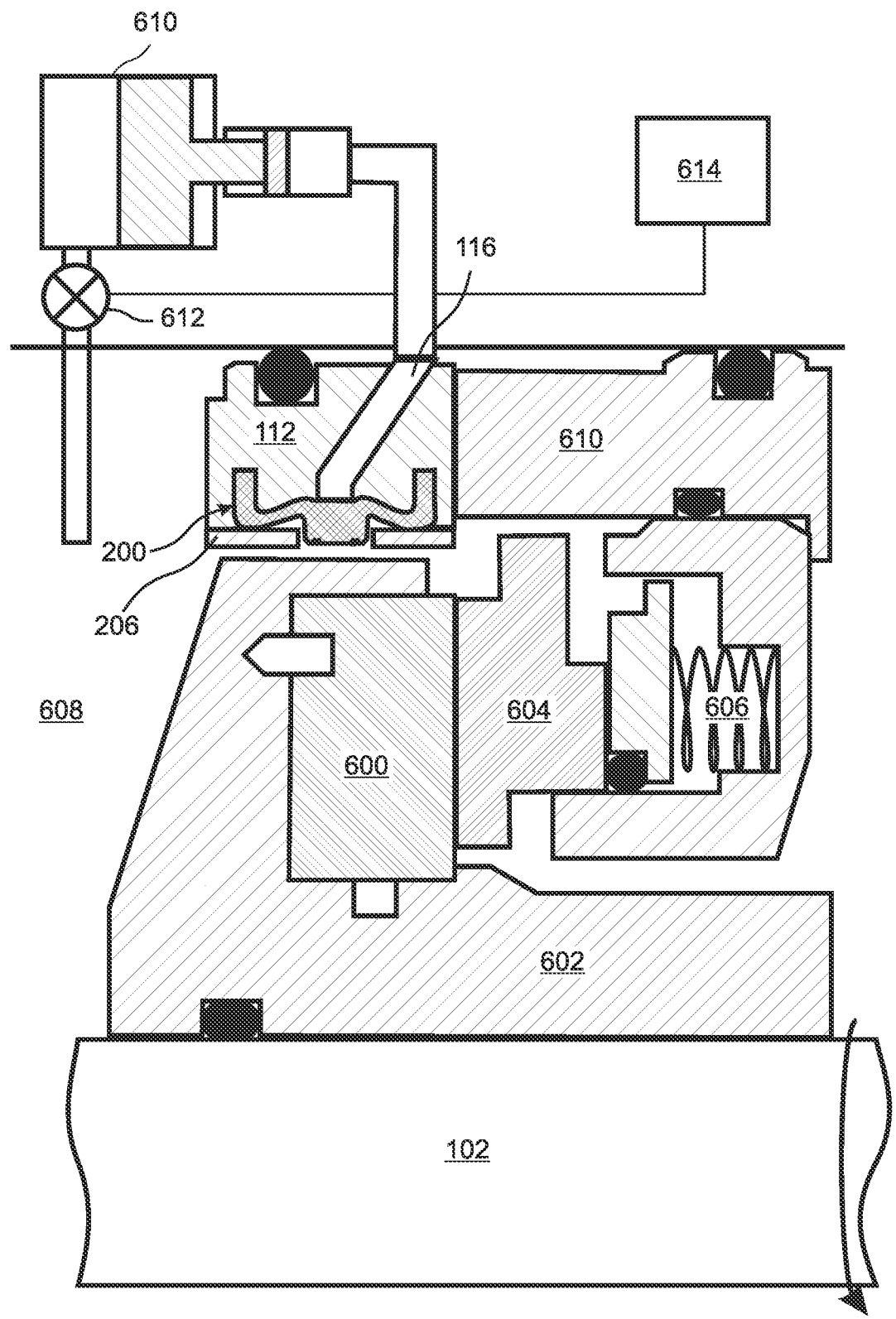
FIG. 6 is an axial cross-sectional view of a unitary dual seal that incorporates the embodiment of FIG. 2A upstream of an end face mechanical rotating shaft seal.

With reference to FIG. 6, the standstill seal of the present invention can be implemented together with at least one rotating shaft seal. In the embodiment of FIG. 6, the standstill seal is implemented upstream of an end face mechanical seal that includes a rotating seal face 600 that is sealed to the shaft by an intermediate support structure 602, and a static seal face 604 that is sealed to the housing 610 and is pushed toward the rotating seal face 600 by a spring 606. In the illustrated embodiment, the central region 202 of the flexible band 200 is configured to form a seal against the intermediate support structure 602 when the shaft 102 is not rotating, rather than forming a seal directly with the shaft 102. It will be noted that the illustrated embodiment integrates the standstill seal with the end face mechanical seal into a single unit.

In some embodiments, the source of the control fluid is independent of the process, and can be, for example, a source of pressurized nitrogen gas or pressurized air, or a source of a pressurized liquid. In the embodiment of FIG. 6, the control fluid is the process fluid. In the illustrated embodiment, process fluid is drawn from a pressurized side 608 of the seals, and is passed through a pressure boosting device 610 that increases the pressure of the process fluid before it is applied to the rear of the flexible band 200. A valve 612 that controls the flow of the process fluid into the pressure boosting device 610 is actuated by a controller 614 that, in embodiments, also controls the stopping and starting of the rotation of the shaft 102.

In similar embodiments, the standstill seal is implemented downstream of the rotating shaft seal. Or, if a plurality of rotating shaft seals are included, the standstill seal can be implemented between the rotating shaft seals. In some embodiments, a plurality of the disclosed standstill seals are deployed, for example one upstream of a rotating shaft seal and one downstream of the rotating shaft seal.

Figure 7B:
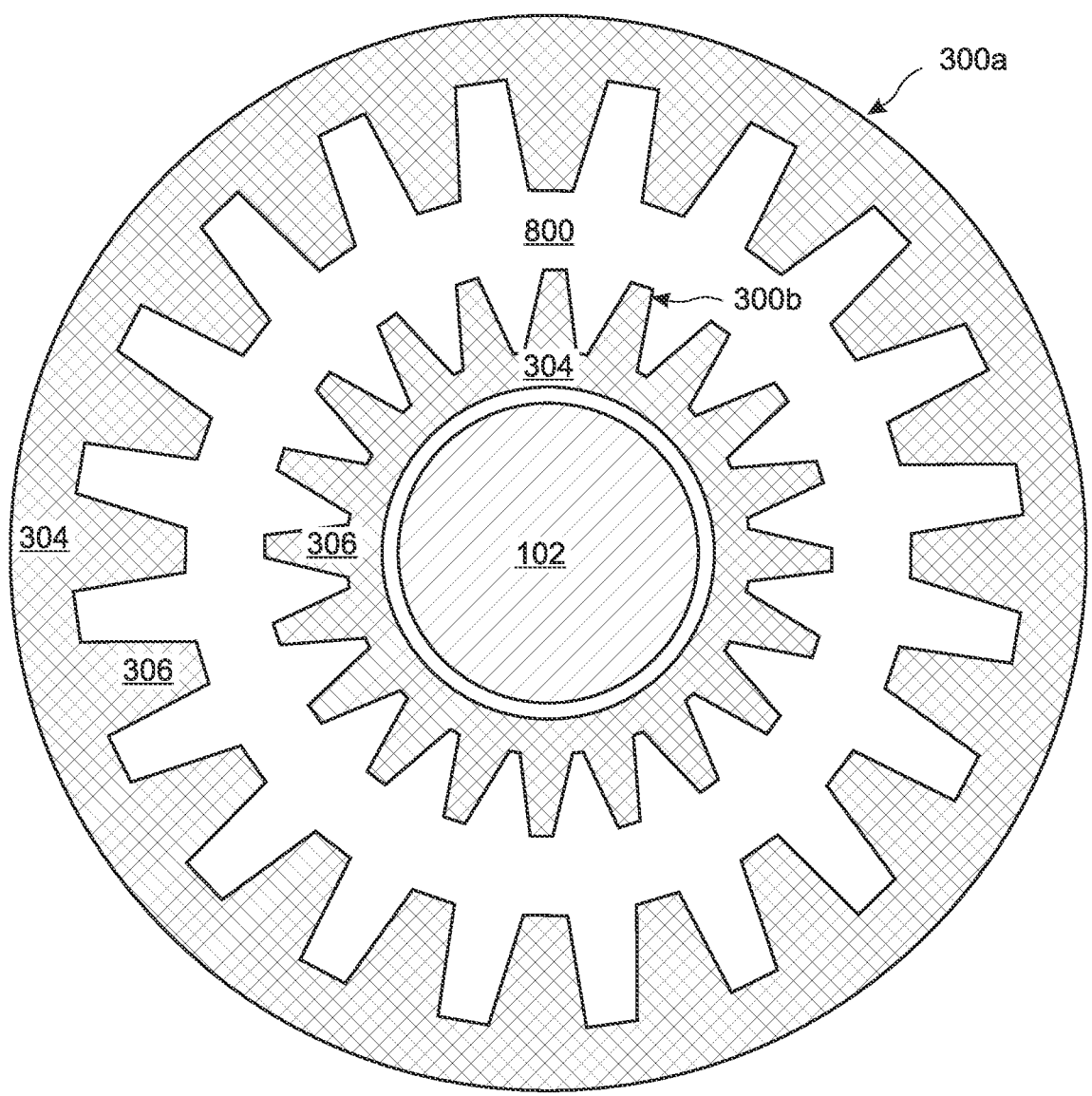
FIG. 7B is a radial cross-sectional view of springs that are included in the embodiment of FIG. 7A.

While the disclosed stationary seal is sometimes described herein as acting radially inward, it will be clear to those of skill in the art that in other embodiments the stationary seal is axial rather than radial. For example, with reference to FIG. 7A, in embodiments the central region 202 of the flexible band 200 is pressed axially against a radially extending face 700 that is sealed by an intermediate support structure 602 to the rotating shaft 102. In the illustrated embodiment, the side regions 204 of the flexible band 200 extend radially rather than axially, and with reference to FIG. 7B the springs 300a, 300b are concentric rather than opposing, with the teeth of the outer spring 300a directed radially inward and the teeth of the inner spring 300b directed radially outward, with a gap 800 provided therebetween through which the central region 202 of the flexible band 200 can be deployed.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A standstill seal configured to form a seal with a rotatable shaft so as to prevent leakage of a process fluid past the standstill seal when the shaft is not rotating, the standstill seal comprising:
   a flexible band surrounding the shaft, the flexible band comprising a relatively thicker central region from which relatively thinner side regions extend in a longitudinal direction, the central region, in longitudinal cross section, being substantially rectangular, and being symmetric about a centerline thereof extending perpendicular to the longitudinal direction;
   a housing configured to house the flexible band;
   a pair of cover plates underlying the side regions of the flexible band and configured to prevent the side regions from being deflected past the cover plates, a cover plate gap being provided between the cover plates through which the central region of the flexible band can be extended;
   a control fluid inlet configured to provide fluid communication between a source of pressurized control fluid and a rear surface of the central region of the flexible band, the rear surface of the central region of the flexible band being in direct contact with the housing when the pressurized control fluid is not applied to the control fluid inlet;
   a controller; and
   a sealing surface parallel to the cover plates and extending fully across the cover plate gap at a uniform offset from the cover plates and from the cover plate gap, the sealing surface being either a surface of the shaft or a surface of an intermediate structure that is sealed to the shaft;
   the standstill seal being configured, when the controller applies the pressurized control fluid to the control fluid inlet, to press the rear surface of the central region of the flexible band toward the cover plate gap by flexing and distorting the side regions of the flexible band, such that the rear surface of the central region of the flexible band is no longer in direct contact with the housing, thereby extending the central region of the flexible band through the cover plate gap, such that the central region makes contact and forms a seal with the sealing surface substantially across an entire width of the central region, the rectangular shape of the central region being retained without distortion when the central region forms the seal with the sealing surface and the process fluid applies a lateral pressure to the central region;
   the standstill seal being configured, when the controller ceases to apply the pressurized control fluid to the flexible band, to withdraw the central region of the flexible band away from the sealing surface, said withdrawing being assisted by the side regions of the flexible band, which are configured to apply a withdrawing force to the central region of the flexible band that tends to withdraw the central region of the flexible band from the sealing surface.

2. The standstill seal of claim 1, wherein the standstill seal is configured to apply the central region of the flexible band radially inward against the sealing surface.

3. The standstill seal of claim 1, wherein the standstill seal is configured to apply the central region of the flexible band axially against the sealing surface.

4. The standstill seal of claim 1, further comprising a pair of rigid annular support rings configured to support sides of the central region of the flexible band when the central region is extended through the cover plate gap.

5. The standstill seal of claim 4, wherein:
the standstill seal is configured to apply the central region of the flexible band radially inward against the sealing surface; and
the annular support rings include ring gaps that enable the annular support rings to compress radially when the central region is extended radially inward against the sealing surface.

6. The standstill seal of claim 4, wherein the annular support rings are fixed to the central region of the flexible band.

7. The standstill seal of claim 4, wherein the annular support rings extend from the housing.

8. The standstill seal of claim 1, wherein the flexible band includes sufficient elasticity to cause the central region to be withdrawn from the sealing surface when the controller ceases to apply the pressurized control fluid to the flexible band.

9. The standstill seal of claim 1, further comprising a spring that is configured to assist the withdrawal of the central region of the flexible band from the sealing surface when the controller ceases to apply the pressurized control fluid to the flexible band.

10. The standstill seal of claim 9, wherein:
the standstill seal is configured to apply the central region of the flexible band radially inward against the sealing surface; and
the spring comprises a pair of spaced apart annular bands having solid annular portions from which teeth extend axially toward each other beneath the side regions of the flexible band, an axial gap being provided between the teeth through which the central region of the flexible band can be extended to contact the sealing surface, the teeth being bent radially inward as the central region of the flexible band is pushed toward the sealing surface.

11. The standstill seal of claim 10, wherein the standstill seal further comprises a pair of rigid annular support rings that extend radially inward from the springs, the rigid annular support rings being configured to support sides of the central region of the flexible band when the central region is applied radially inward against the sealing surface.

12. The standstill seal of claim 9, wherein:
the standstill seal is configured to apply the central region of the flexible band radially inward against the sealing surface;
the standstill seal comprises a pair of rigid annular support rings that support opposing sides of the central region of the flexible band when the central region is extended through the cover plate gap, the support rings including circumferential gaps enabling radially inward compression of the support rings; and
the springs are compression springs applied to the gaps in the support rings.

13. The standstill seal of claim 9, wherein:
the standstill seal is configured to apply the central region of the flexible band axially against the sealing surface; and
the spring comprises a pair of radially concentric annular disks having solid annular portions from which teeth extend radially inward and outward toward each other beneath the side regions of the flexible band, a radial gap being provided between the radially inward and radially outward teeth through which the central region of the flexible band can be extended to contact the sealing surface, the teeth being bent axially as the central region of the flexible band is pushed toward the sealing surface.

14. The standstill seal of claim 1, wherein the side regions of the flexible band include portions that are curved in longitudinal cross section, thereby enabling extension of the side regions when the central region is extended through the cover plate gap.

15. The standstill seal of claim 1, wherein the standstill seal is unitary with a rotating shaft seal that is configured to form a seal with the shaft when the shaft is rotating.

16. The standstill seal of claim 15, wherein the standstill seal is configured to form a seal with the sealing surface upstream of the rotating shaft seal.

17. The standstill seal of claim 15, wherein the standstill seal is configured to form a seal with the sealing surface downstream of the rotating shaft seal.

18. The standstill seal of claim 1, wherein the control fluid is a gas.

19. The standstill seal of claim 1, wherein the control fluid is the process fluid.

20. The standstill seal of claim 1, wherein the controller is configured to start and stop the rotation of the shaft, as well as controlling the application of the pressurized control fluid to the flexible band.

* * * * *